US012166608B2

(12) United States Patent
Li et al.

(10) Patent No.: US 12,166,608 B2
(45) Date of Patent: Dec. 10, 2024

(54) ANTI-INTERFERENCE METHOD FOR NEW RADIO NETWORK

(71) Applicant: HUAWEI TECHNOLOGIES CO., LTD., Guangdong (CN)

(72) Inventors: Wenzheng Li, Shenzhen (CN); Zhihua Liu, Shanghai (CN); Bing Yang, Shanghai (CN); Liuhai Chen, Shanghai (CN); Feng Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/322,557

(22) Filed: May 23, 2023

(65) Prior Publication Data
US 2023/0300009 A1 Sep. 21, 2023

Related U.S. Application Data

(63) Continuation of application No. PCT/CN2020/134047, filed on Dec. 4, 2020.

(51) Int. Cl.
H04L 25/08 (2006.01)
(52) U.S. Cl.
CPC .................. H04L 25/08 (2013.01)
(58) Field of Classification Search
CPC .... H04L 25/08; H04L 25/0226; H04L 5/0073
See application file for complete search history.

(56) References Cited

U.S. PATENT DOCUMENTS

2017/0264464 A1* 9/2017 Shen ................... H04L 25/0202
2020/0137730 A1* 4/2020 Zhang ................... H04W 72/23

OTHER PUBLICATIONS

Machine translation CN-107171740-B (Year: 2020).*
Machine translation CN-107769902-A (Year: 2018).*
Machine translation WO-2021129069-A1 (Year: 2021).*
Samsung, On LTE-NR Coexistence, 3GPP TSG RAN WG1 #90b R1-1717691, publication date: Oct. 2, 2017, total 3 pages.
Ericsson, Nokia, Nokia Shanghai Bell, AT and T, LTE-NR resource allocation coordination over X2, 3GPP TSG RAN WG3 #99 R3-181284, publication date Feb. 17, 2018, total 6 pages.

* cited by examiner

Primary Examiner — Jean B Corrielus
(74) Attorney, Agent, or Firm — HUAWEI TECHNOLOGIES CO., LTD.

(57) ABSTRACT

This disclosure provides an anti-interference method for a new radio network, to reduce intra-frequency interference caused by a long term evolution (LTE) cell to a neighboring new radio (NR) cell. In the method, a base station obtains network configuration information of at least one LTE cell neighboring to an NR cell, based thereon determines anti-interference configuration information that includes an anti-interference pattern having a plurality of strip areas, in which at least one first area and at least one second area are distributed in spacing, the first area is used to carry a service signal of the NR cell, and the second area is used to carry an interference signal of the at least one LTE cell. The base station sends the anti-interference configuration information to a target user equipment for selecting the at least one first area to carry the service signal of the NR cell.

19 Claims, 15 Drawing Sheets

ANTI-INTERFERENCE METHOD FOR NEW RADIO NETWORK

CROSS-REFERENCE TO RELATED APPLICATIONS

This application is a continuation of International Application No. PCT/CN2020/134047, filed on Dec. 4, 2020, the disclosure of which is hereby incorporated by reference in its entirety.

TECHNICAL FIELD

This disclosure relates to the communication field, and in particular, to an anti-interference method for a new radio network, a new radio base station, and user equipment.

BACKGROUND

Because a new radio (new radio, NR) communication system is designed based on a full-beam air interface, and there is no cell-level reference signal that is continuously sent, a long term evolution (long term evolution, LTE) cell causes great intra-frequency interference impact on a neighboring NR cell. Especially at an early stage of NR network deployment, an LTE network is in a relatively overloaded state because a quantity of users of an NR network is less than a quantity of users of the LTE network. In this case, intra-frequency interference impact caused by an LTE cell in the relatively overloaded state on an NR cell in a relatively underloaded state further deteriorates.

In a related technology, to reduce intra-frequency interference caused by the LTE cell to the neighboring NR cell, an operator can only deploy a bufferzone to minimize the intra-frequency interference caused by the LTE cell to the neighboring NR cell. A specific method for deploying the bufferzone is to plan a sufficient geographical spacing between the NR cell and the LTE cell, to reduce, to an acceptable degree, the intra-frequency interference caused by the LTE cell to the neighboring NR cell.

Although deploying the bufferzone can reduce the intra-frequency interference caused by the LTE cell to the neighboring NR cell, a coverage hole between the LTE network and the NR network is also caused. This affects continuity of the LTE network and the NR network.

SUMMARY

This disclosure provides an anti-interference method for a new radio network, to reduce intra-frequency interference caused by an LTE cell to a neighboring NR cell.

A first aspect of embodiments of this disclosure provides an anti-interference method for a new radio network. The method is used by user equipment in an NR cell to reduce intra-frequency interference caused by a neighboring NR cell. The method includes: A base station corresponding to a new radio NR cell obtains network configuration information of at least one long term evolution LTE cell neighboring to the NR cell; the base station determines anti-interference configuration information based on the network configuration information, where the anti-interference configuration information includes an anti-interference pattern, the anti-interference pattern includes a plurality of strip areas, the strip area indicates all frequency areas at a specified time domain position, the plurality of strip areas include at least one first area and at least one second area that are distributed in spacing, the first area is used to carry a service signal of the NR cell, and the second area is used to carry an interference signal of the at least one LTE cell; and the base station sends the anti-interference configuration information to target user equipment, where the anti-interference configuration information is used by the target user equipment to select the at least one first area to carry the service signal of the NR cell, and the target user equipment is any user equipment in a coverage area of the NR cell.

In a possible implementation of the first aspect, that the base station determines anti-interference configuration information based on the network configuration information includes: The base station determines, from a time domain range of the base station based on the network configuration information, a time domain position of the at least one second area used to carry the interference signal of the at least one LTE cell, where the time domain position of the second area is included in a time domain position of the base station, the time domain position of the at least one second area is used to determine a time domain position of the at least one first area, and the time domain positions of the at least one second area and the at least one first area are used to determine the anti-interference configuration information.

In the possible implementation, embodiments of this application provide a specific method for determining the anti-interference configuration information, to improve feasibility of the solution.

In a possible implementation of the first aspect, after the base station sends the anti-interference configuration information to target user equipment, the method further includes: The base station receives signal quality information sent by the target user equipment, where the signal quality information indicates quality of a service signal provided by the base station for the target user equipment; and if the base station determines that the signal quality information meets a preset condition, the base station sends an anti-interference enabling instruction to the target user equipment, where the anti-interference enabling instruction instructs the target user equipment to put the anti-interference pattern into effect.

In the possible implementation, in embodiments of this application, whether to put the anti-interference pattern into effect may be adjusted in real time based on the quality of the current service signal of the target user equipment, to increase flexibility of executing the solution, reduce an unnecessary resource waste, and improve feasibility of the solution.

In a possible implementation of the first aspect, the anti-interference configuration information includes additional pilot information, a time domain position corresponding to the additional pilot information belongs to the second area, and before the base station sends the anti-interference configuration information to the target user equipment, the method further includes: if the base station determines that the time domain position corresponding to the additional pilot information belongs to the second area, using the first area to carry the additional pilot information.

In the possible implementation, in embodiments of this application, both an anti-interference configuration and an additional pilot configuration may be implemented, and no conflict occurs, to increase applicability of the solution.

In a possible implementation of the first aspect, the base station corresponding to the NR cell and a base station corresponding to the at least one LTE cell are a same base station, the network configuration information of the at least one LTE cell is stored in the base station corresponding to the at least one LTE cell, and that a base station corresponding to an NR cell obtains network configuration information of at least one LTE cell neighboring to the NR cell includes: The base station corresponding to the NR cell extracts the network configuration information that is of the at least one LTE cell neighboring to the NR cell and that is stored in the base station.

In the possible implementation, embodiments of this application provide a method for obtaining the network configuration information when the base station corresponding to the NR cell and the base station corresponding to the at least one LTE cell are a same base station, to improve flexibility of executing the solution, reduce an unnecessary resource waste, and improve feasibility of the solution.

A second aspect of embodiments of this application provides an anti-interference method for a new radio network. The method is used by user equipment in an NR cell to reduce intra-frequency interference caused by a neighboring NR cell. The method includes: Target user equipment receives anti-interference configuration information sent by a base station corresponding to a new radio NR cell, where the anti-interference configuration information includes an anti-interference pattern, the anti-interference pattern includes a plurality of strip areas, the strip area indicates all frequency areas at a specified time domain position, the plurality of strip areas include at least one first area and at least one second area that are distributed in spacing, the first area is used to carry a service signal of the NR cell, the second area is used to carry an interference signal of at least one LTE cell, and the anti-interference configuration information is used by the target user equipment to select the at least one first area to carry the service signal of the NR cell; and the target user equipment puts, based on the anti-interference configuration information, the anti-interference pattern into effect.

In a possible implementation of the second aspect, before the target user equipment puts, based on the anti-interference configuration information, the anti-interference pattern into effect, and after target user equipment receives anti-interference configuration information sent by a base station corresponding to an NR cell, the method further includes: The target user equipment sends signal quality information to the base station, where the signal quality information is used by the base station to send an anti-interference instruction to the target user equipment based on the signal quality information; and the target user equipment receives the anti-interference enabling instruction sent by the base station, where the anti-interference enabling instruction instructs the target user equipment to put, based on the anti-interference configuration information, the anti-interference pattern into effect. In the possible implementation, in embodiments of this application, whether to put the anti-interference pattern into effect may be adjusted in real time based on quality of a current service signal of the target user equipment, to increase flexibility of executing the solution, reduce an unnecessary resource waste, and improve feasibility of the solution.

A third aspect of embodiments of this application provides a base station, where the base station has a function of implementing the method according to any one of the first aspect or the possible implementations of the first aspect. The function may be implemented by hardware, or may be implemented by hardware executing corresponding software. The hardware or the software includes one or more modules corresponding to the foregoing function, for example, an obtaining unit.

A fourth aspect of embodiments of this application provides target user equipment, where the target user equipment has a function of implementing the method according to any one of the second aspect or the possible implementations of the second aspect. The function may be implemented by hardware, or may be implemented by hardware executing corresponding software. The hardware or the software includes one or more modules corresponding to the foregoing function, for example, a first receiving unit.

A fifth aspect of this application provides a base station. The base station includes at least one processor, a memory, an input/output (input/output, I/O) interface, and computer-executable instructions that are stored in the memory and that can be run on the processor. When the computer-executable instructions are executed by the processor, the processor performs the method according to any one of the first aspect or the possible implementations of the first aspect.

A sixth aspect of this application provides target user equipment. The target user equipment includes at least one processor, a memory, an input/output (input/output, I/O) interface, and computer-executable instructions that are stored in the memory and that can be run on the processor. When the computer-executable instructions are executed by the processor, the processor performs the method according to any one of the second aspect or the possible implementations of the second aspect.

A seventh aspect of this application provides a computer-readable storage medium storing one or more computer-executable instructions. When the computer-executable instructions are executed by a processor, the processor performs the method according to any one of the first aspect or the possible implementations of the first aspect.

An eighth aspect of this application provides a computer-readable storage medium storing one or more computer-executable instructions. When the computer-executable instructions are executed by a processor, the processor performs the method according to any one of the second aspect or the possible implementations of the second aspect.

A ninth aspect of this application provides a computer program product storing one or more computer-executable instructions. When the computer-executable instructions are executed by a processor, the processor performs the method according to any one of the first aspect or the possible implementations of the first aspect.

A tenth aspect of this application provides a computer program product storing one or more computer-executable instructions. When the computer-executable instructions are executed by a processor, the processor performs the method according to any one of the second aspect or the possible implementations of the second aspect.

An eleventh aspect of this application provides a chip system. The chip system includes at least one processor, and the at least one processor is configured to implement the function in any one of the first aspect or the possible implementations of the first aspect. In a possible design, the chip system may further include a memory. The memory is configured to store program instructions and data that are necessary for an artificial intelligence model processing apparatus. The chip system may include a chip, or may include a chip and another discrete component.

A twelfth aspect of this application provides a chip system. The chip system includes at least one processor, and the at least one processor is configured to implement the function in any one of the second aspect or the possible implementations of the second aspect. In a possible design, the chip system may further include a memory. The memory is configured to store program instructions and data that are necessary for an artificial intelligence model-based data processing apparatus. The chip system may include a chip, or may include a chip and another discrete component.

A thirteenth aspect of this application provides a new radio NR network system. The NR network system includes the base station according to the third aspect and the target user equipment according to the fourth aspect.

According to the foregoing technical solutions, it can be learned that embodiments of this application have the following advantages:

In embodiments of this application, target user equipment includes a service signal in a first area that is in an anti-interference pattern and that has no interference signal of a neighboring LTE cell, and a second area is used to carry an interference signal of at least one LTE cell. Therefore, when no geographically isolated bufferzone is deployed, intra-frequency interference caused by the LTE cell to a neighboring NR cell can be reduced, thereby ensuring network coverage integrity and continuity of an LTE network and an NR network. In addition, a solution in which the LTE network and the NR network jointly cover a same area is also supported.

DESCRIPTION OF EMBODIMENTS

Embodiments of this application provide an anti-interference method for a new radio network, to reduce intra-frequency interference caused by an LTE cell to a neighboring NR cell.

Because a new radio (new radio, NR) communication system is designed based on a full-beam air interface, and there is no cell-level reference signal that is continuously sent, the long term evolution (long term evolution, LTE) cell causes great intra-frequency interference impact on the neighboring NR cell. Especially at an early stage of NR network deployment, an LTE network is in a relatively overloaded state because a quantity of users of an NR network is less than a quantity of users of the LTE network. In this case, interference impact of an LTE cell reference signal (cell reference signal, CRS) of an LTE cell in the relatively overloaded state on an NR cell in a relatively underloaded state further extends. However, at the early stage of NR network deployment, the user of the LTE network needs to coexist with the user of the NR network for a period of time. Therefore, the intra-frequency interference caused by the LTE cell to the neighboring NR cell greatly affects experience of the user of the NR network.

Figure 1:
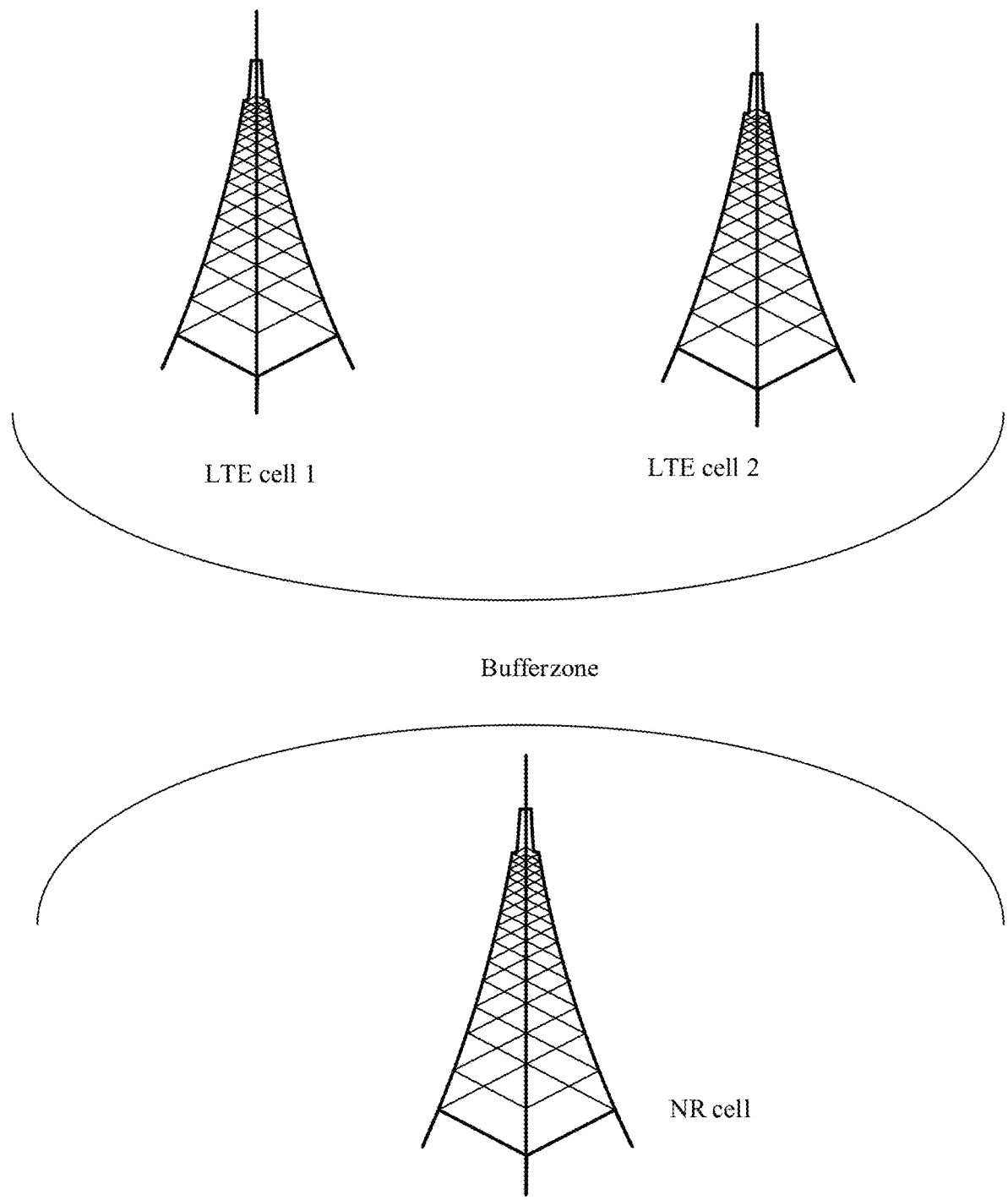
FIG. 1 is a schematic diagram of a scenario of a new radio network.

Refer to FIG. 1. In a related technology, no related general anti-interference algorithm is formulated in a conventional technology to reduce intra-frequency interference caused by an LTE cell to a neighboring NR cell. Therefore, to reduce the intra-frequency interference caused by the LTE cell to the neighboring NR cell, an operator can only deploy a geographically isolated bufferzone to minimize the intra-frequency interference caused by the LTE cell to the neighboring NR cell. A specific method for deploying the bufferzone is to plan a sufficient geographical spacing between the NR cell and the LTE cell, to reduce, to an acceptable degree, the intra-frequency interference caused by the LTE cell to the neighboring NR cell. The bufferzone needs be planned based on engineering parameters such as antenna heights, azimuths, and downtilt of the LTE and NR cells, and designed and planned by using a planning tool based on different propagation environments, different geographical areas, and used frequency bands. Finally, a geographical area size of the bufferzone that meets a requirement is obtained.

Figure 2A:
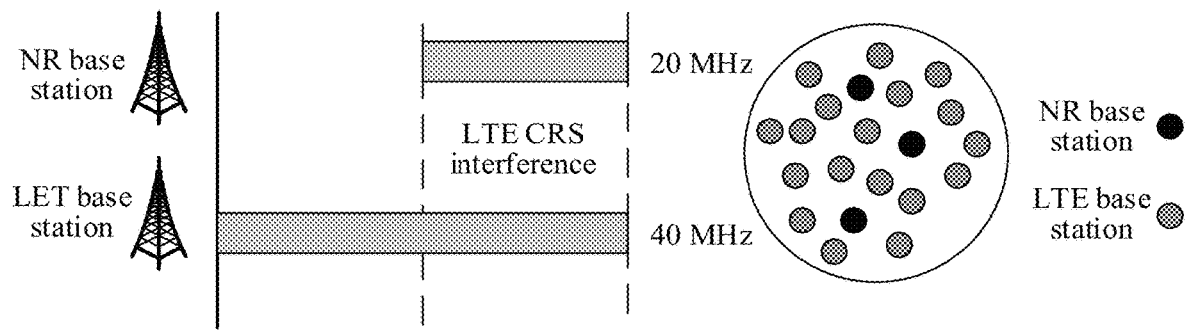
FIG. 2A, FIG. 2B, and FIG. 2C are schematic diagrams of scenarios of a new radio network.
Figure 2B:
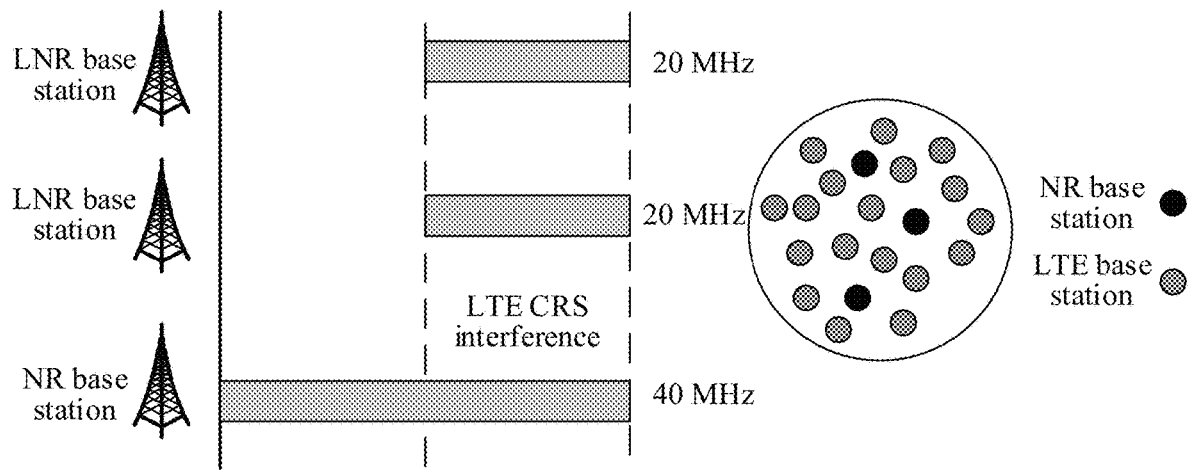
Figure 2C:
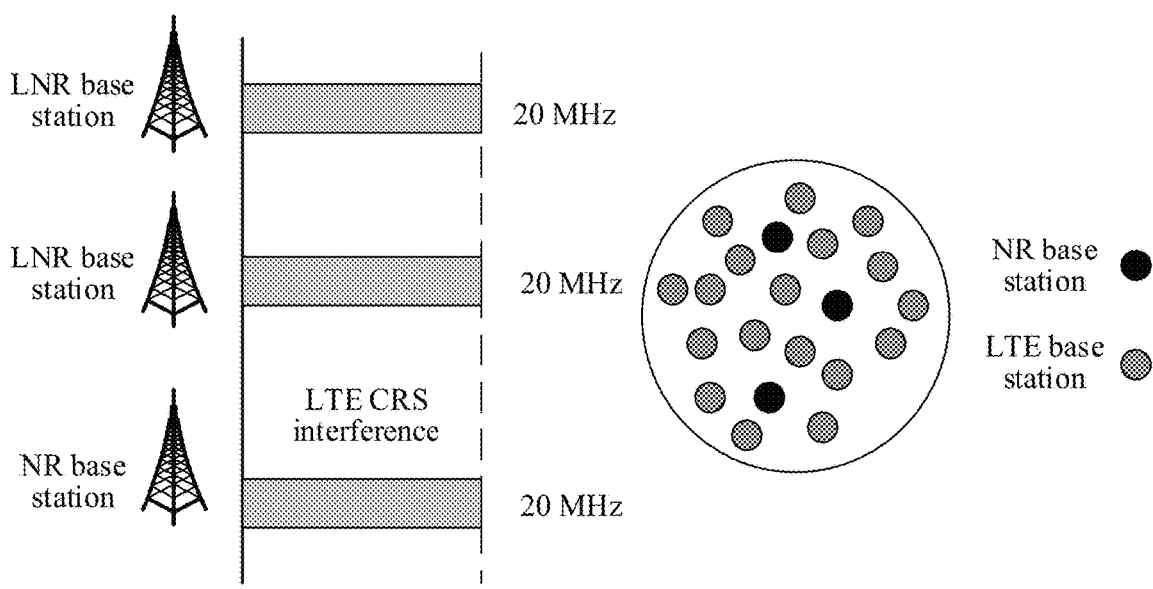

Refer to FIG. 2A, FIG. 2B, and FIG. 2C. Although deploying the geographically isolated bufferzone can reduce the intra-frequency interference caused by the neighboring LTE cell to the NR cell, a coverage hole between an LTE network and an NR network is also caused. This greatly affects continuous coverage of the LTE network and the NR network. In addition, it is clear that the method for deploying the geographically isolated bufferzone does not support a solution in which the LTE network and the NR network jointly cover a same area. Specifically, in one aspect, a user of the LTE network in a coverage area of the NR cell cannot normally use the LTE network, and a user of the NR network in a coverage area of the LTE cell cannot normally use the NR network either. At an early stage of NR network deployment, a quantity of users of the NR network is small, and a quantity of users of the LTE network is still increasing. Therefore, LTE and NR (LTE and NR, LNR) network mixed networking shown in FIG. 2A is required, but the solution of deploying the geographically isolated bufferzone does not support LNR mixed networking. In another aspect, in a scenario of dynamic spectrum sharing (dynamic spectrum sharing, DSS) between the NR cell and the LTE cell, regardless of whether the NR cell and the LTE cell have different bandwidth spectrums, as shown in FIG. 2B, or the NR cell and the LTE cell have a same bandwidth spectrum, as shown in FIG. 2C, there is definitely a common coverage area of the LTE network and the NR network. Therefore, bufferzone deployment does not support this scenario either.

Figure 3:
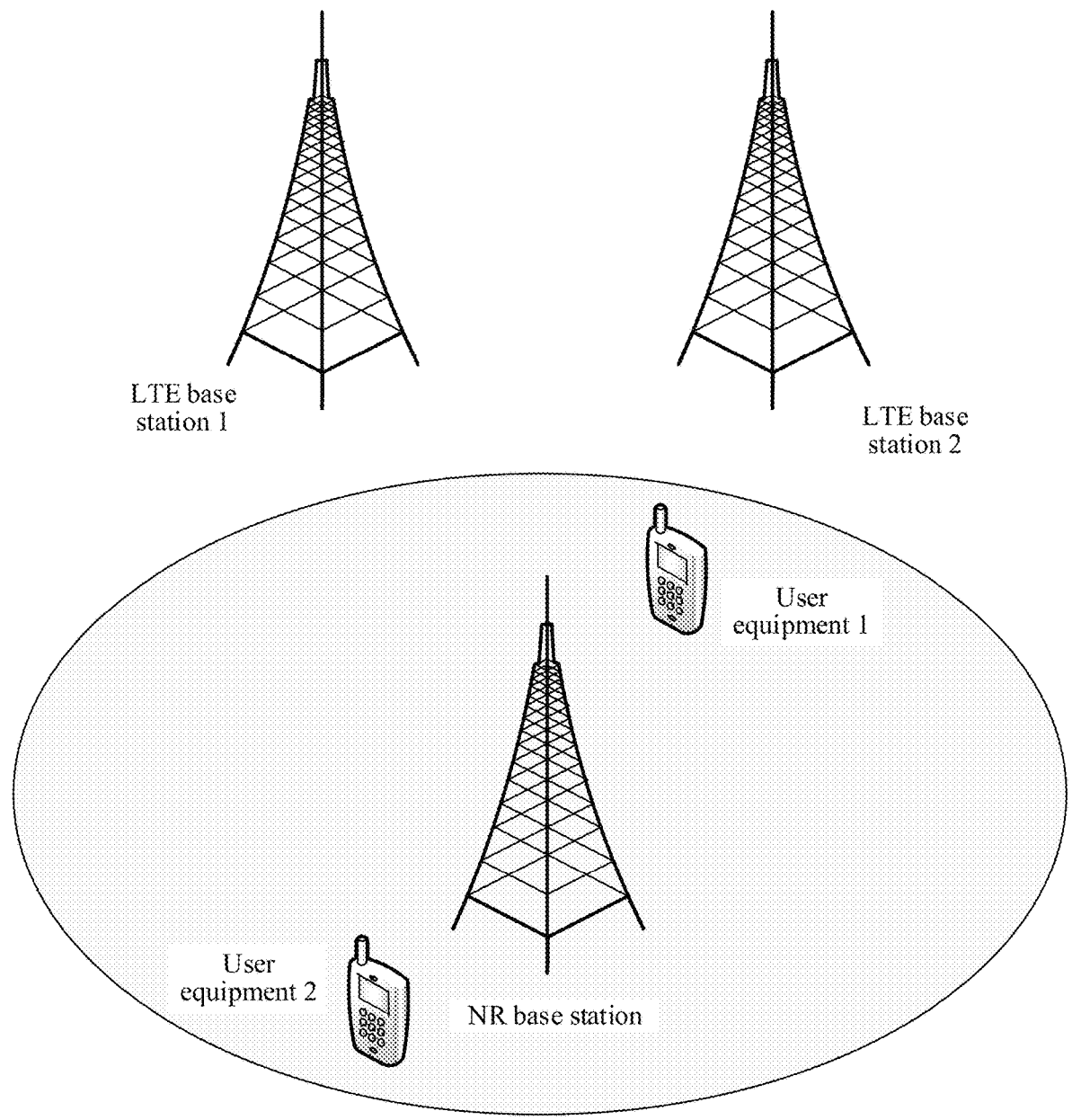
FIG. 3 is a network structural diagram of a routing table optimization method according to an embodiment of this application.

Refer to FIG. 3. In this embodiment of this application, user equipment in an NR cell is interfered by intra-frequency signals from a neighboring LTE cell 1 and a neighboring LTE cell 2. The neighboring LTE cell may be an LTE cell with two CRS ports, or may be an LTE cell with four CRS ports. Comb anti-interference information is configured for all the user equipment in a coverage area of the NR cell, and the comb anti-interference information includes a comb anti-interference pattern. User equipment 1 that is in the NR cell and that receives strong signal interference from the neighboring LTE cell puts the anti-interference pattern into effect, to reduce the signal interference from the neighboring LTE cell.

Figure 4:
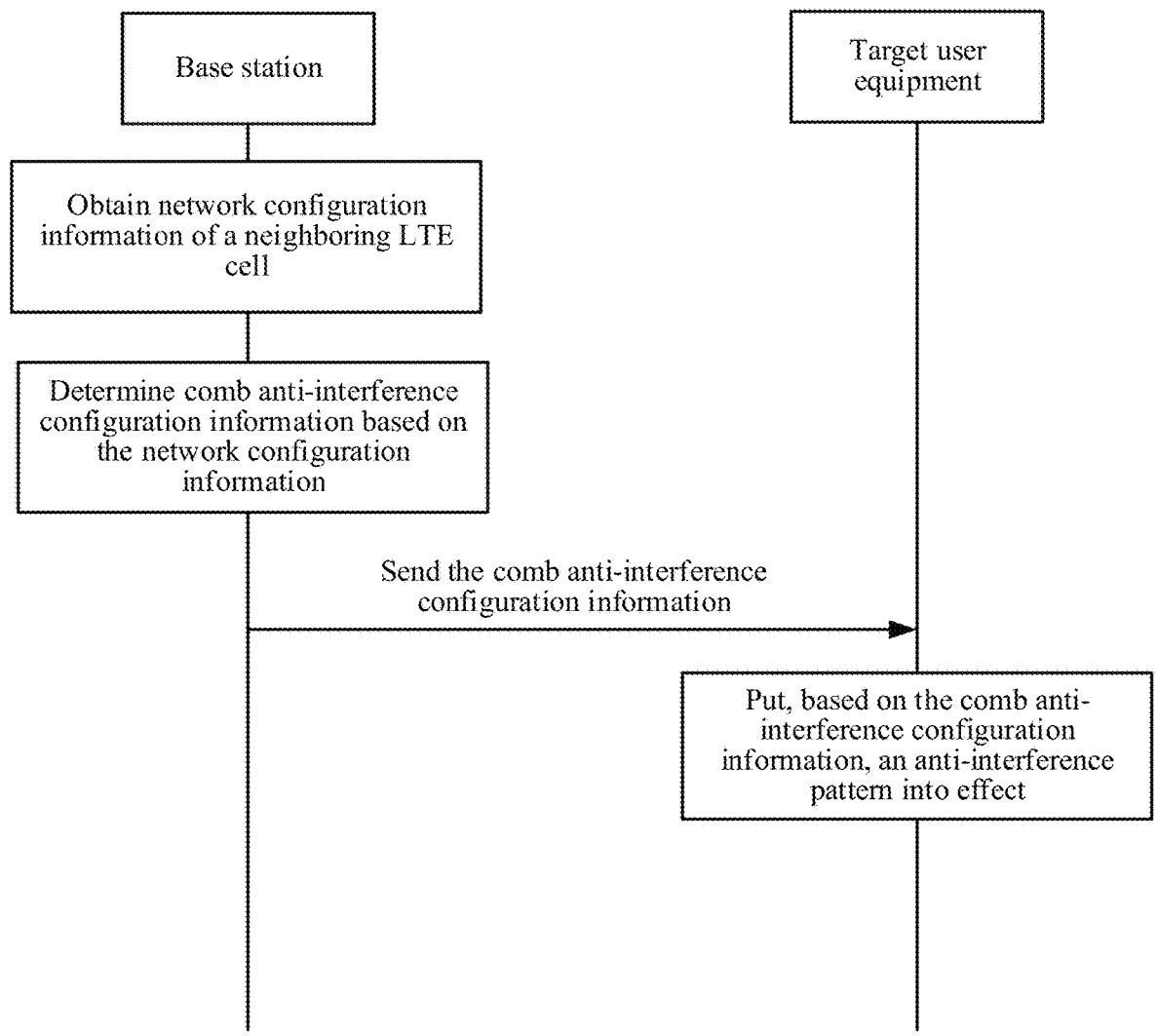
FIG. 4 is a schematic flowchart of an anti-interference method for a new radio network according to an embodiment of this application.

Specifically, refer to FIG. 4. First, a base station corresponding to an NR cell obtains CRS network configuration information of at least one neighboring LTE cell. The base station corresponding to the NR cell configures comb anti-interference configuration information for target user equipment in the NR cell based on the CRS network configuration information, and sends the comb anti-interference configuration information to the target user equipment in the NR cell, where the comb anti-interference configuration information includes a comb anti-interference pattern. Then, target user equipment that receives a strong interference signal from the at least one neighboring LTE cell puts the anti-interference pattern into effect, to reduce signal interference from the neighboring LTE cell.

In this embodiment of this application, the comb anti-interference pattern in the comb anti-interference configuration information sent by the NR cell to the target user equipment may be a periodic comb anti-interference pattern, or may be a dynamic comb anti-interference pattern. The following provides separate descriptions.

1. The comb anti-interference pattern in the comb anti-interference configuration information sent by the NR cell to the target user equipment is a periodic comb anti-interference pattern.

Figure 5:
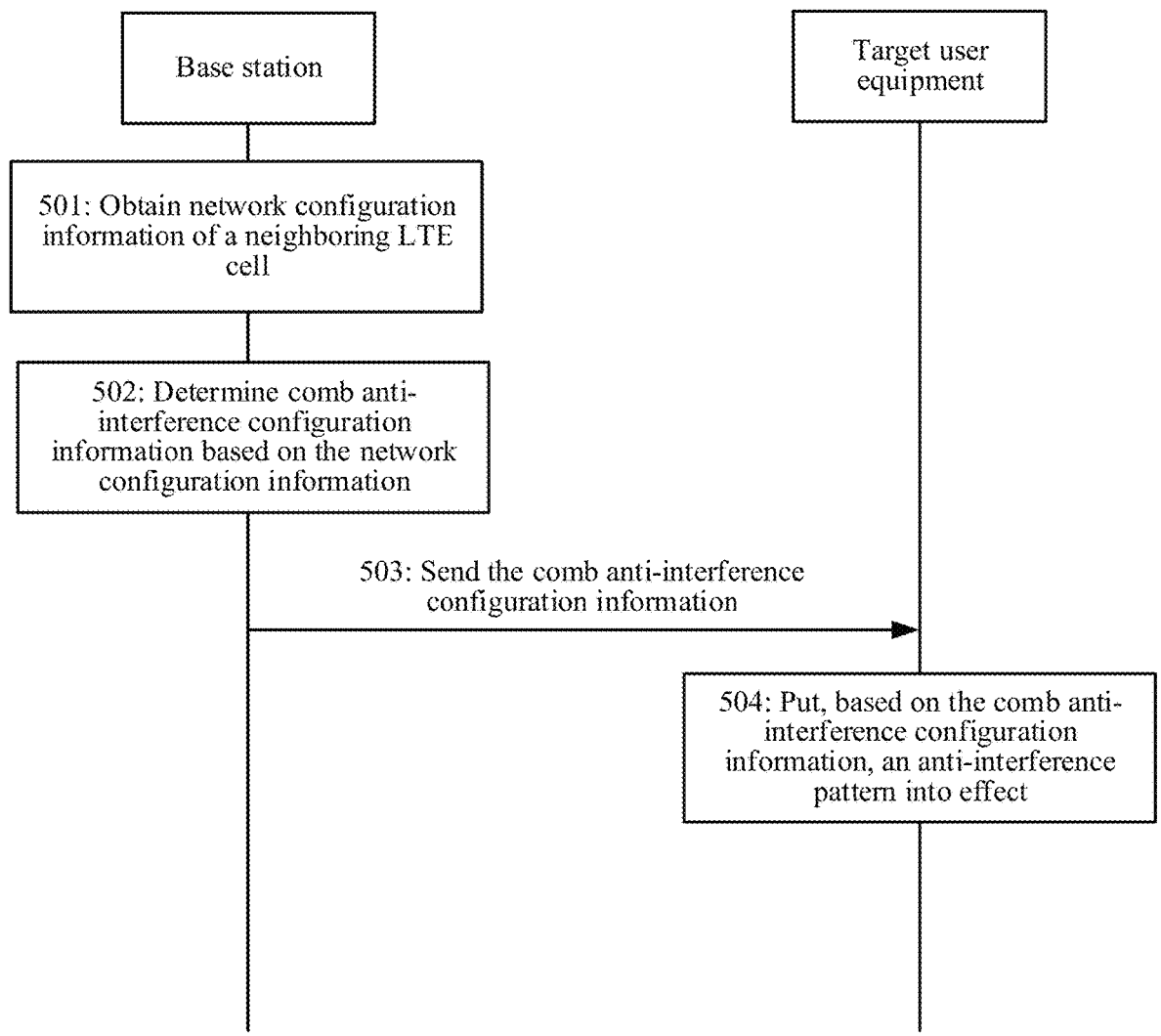
FIG. 5 is another schematic flowchart of an anti-interference method for a new radio network according to an embodiment of this application.

Refer to FIG. 5. A procedure of an anti-interference method for an NR network in this embodiment of this application includes the following steps.

501: A base station corresponding to an NR cell obtains network configuration information of a neighboring LTE cell.

The base station corresponding to the NR cell obtains CRS network configuration information of at least one neighboring LTE cell, where the network configuration information includes a quantity of network ports of the at least one LTE cell. Specifically, the base station corresponding to the NR cell and a base station corresponding to the at least one LTE cell are not a same base station, the CRS network configuration information of the at least one LTE cell is stored in the base station corresponding to the at least one LTE cell, and the base station corresponding to the NR cell obtains the CRS network configuration information of the at least one LTE cell through signaling interaction with the base station corresponding to the at least one LTE cell. The base station corresponding to the NR cell and the base station corresponding to the at least one LTE cell may obtain the CRS network configuration information of the at least one LTE cell by querying a configuration of an inter-RAT neighboring cell.

In a possible implementation, the base station corresponding to the NR cell and the base station corresponding to the at least one LTE cell are a same base station. For example, in a scenario of spectrum sharing between the NR cell and the LTE cell, the base station corresponding to the NR cell and the base station corresponding to the LTE cell may be the same base station. The network configuration information of the at least one LTE cell is stored in the base station corresponding to the at least one LTE cell. In this case, the base station corresponding to the NR cell extracts the network configuration information that is of the at least one LTE cell and that is stored in the base station.

In this embodiment of this application, the base station corresponding to the NR cell and the base station corresponding to the at least one LTE cell may be the same base station, or may be different base stations. This is not specifically limited herein.

502: The base station corresponding to the NR cell determines comb anti-interference configuration information based on the network configuration information.

The NR cell determines the comb anti-interference configuration information based on the CRS network configuration information of the at least one neighboring LTE cell, where the comb anti-interference configuration information includes a comb anti-interference pattern.

Specifically, the base station corresponding to the NR cell may determine, based on the quantity of network ports in the CRS network configuration information of the at least one neighboring LTE cell, at least one time-frequency domain graph corresponding to a CRS interference signal of the at least one LTE cell, where the at least one time-frequency domain graph indicates time domain position distribution and frequency distribution of the CRS interference signal of the at least one neighboring LTE cell; and determine, based on the at least one time-frequency domain graph, one target time-frequency domain graph corresponding to all CRS interference signals of the at least one LTE cell, where the target time-frequency domain graph indicates time domain position distribution and frequency distribution of all the CRS interference signals of the at least one LTE cell.

Figure 6A:
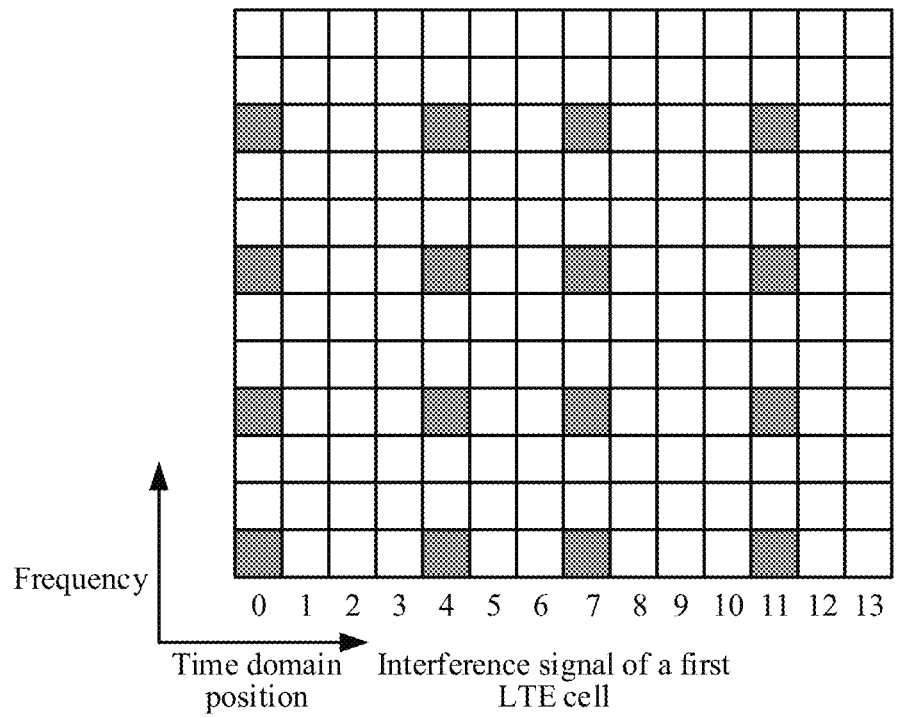
FIG. 6A to FIG. 6F each show a time-frequency domain graph and an anti-interference pattern according to an embodiment of this application.
Figure 6B:
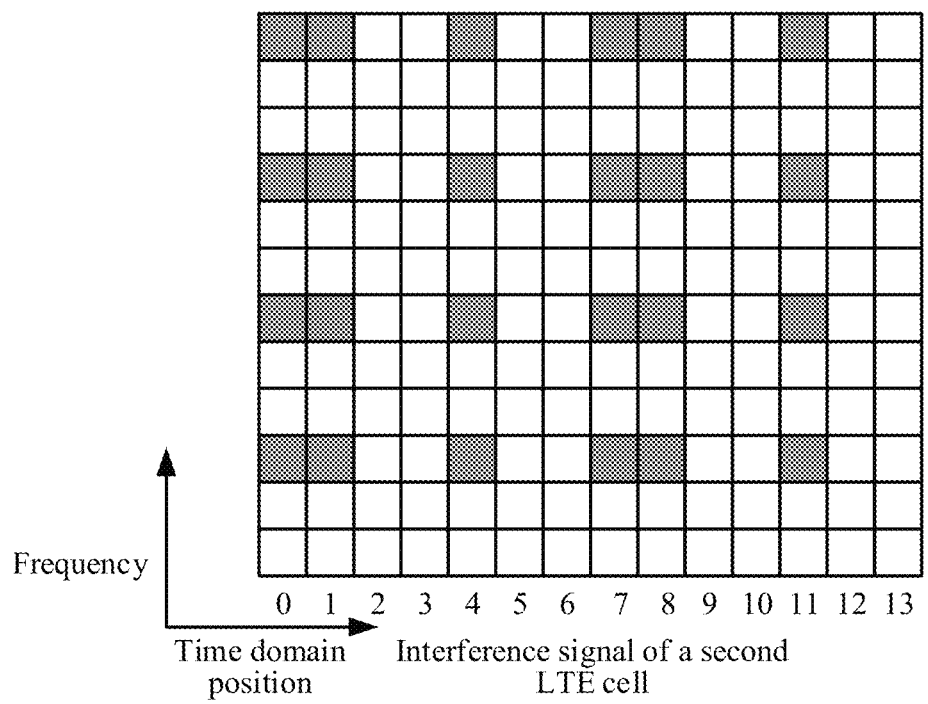
Figure 6C:
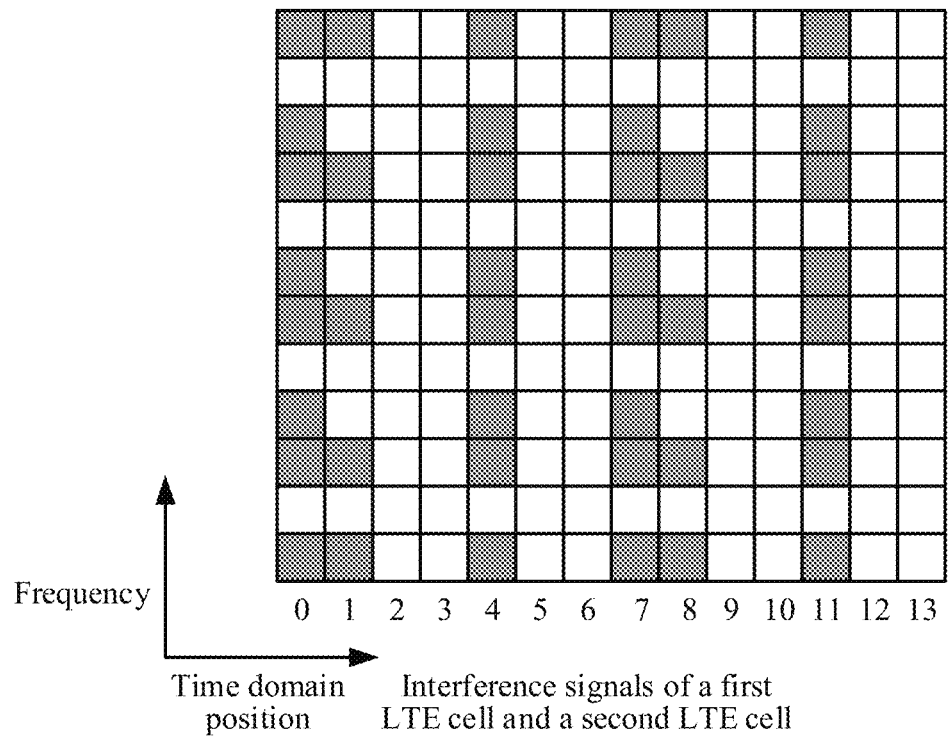

Specifically, refer to FIG. 6A, FIG. 6B, and FIG. 6C. FIG. 6A indicates time domain position distribution and frequency distribution of a CRS interference signal of a first LTE cell. Time domain positions at which the CRS interference signal of the first LTE cell is located are 0, 4, 7, and 11, and no CRS interference signal exists at other time domain positions. FIG. 6B indicates a time-frequency domain graph of a second LTE cell, and describes time domain position distribution and frequency distribution of a CRS interference signal of an LTE neighboring cell 2, where time domain positions at which the CRS interference signal of the LTE neighboring cell 2 is located are 0, 1, 4, 7, 8, and 11, and no CRS interference signal exists at other time domain positions. FIG. 6C indicates time domain position distribution and frequency distribution of all the CRS interference signals of the first LTE cell and the second LTE cell.

Figure 6D:
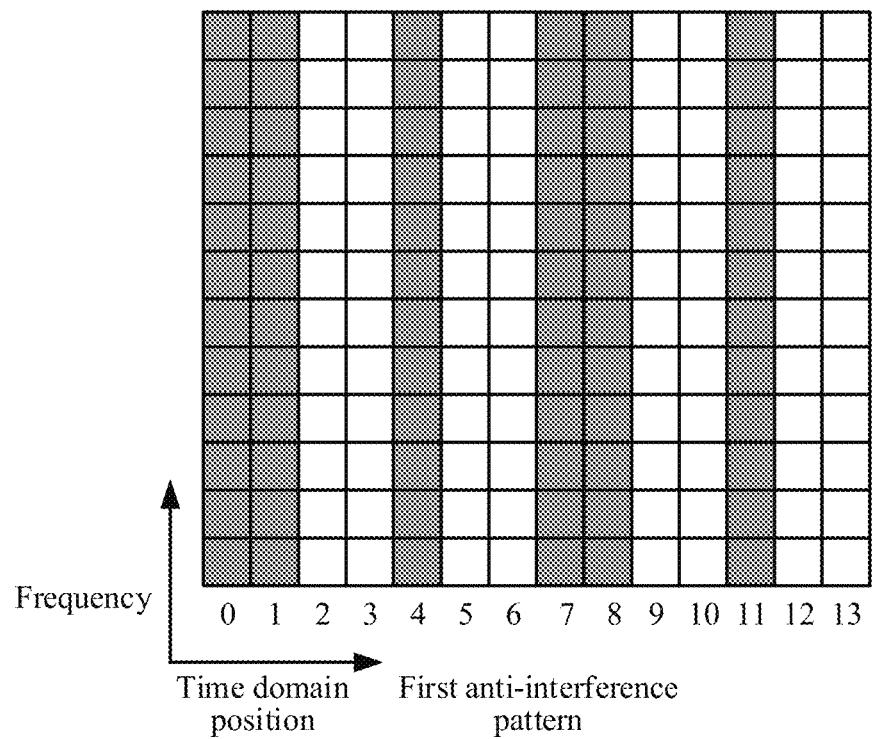

Refer to FIG. 6D. The base station corresponding to the NR cell determines the comb anti-interference pattern based on the target time-frequency domain graph. The comb anti-interference pattern includes a plurality of strip areas, each strip area indicates all frequency areas at a specified time domain position, and the plurality of strip areas include a first area and a second area that are distributed in spacing. The first area is used to carry a service signal of the NR cell, and the second area is used to carry the CRS interference signal of the at least one LTE cell. Specifically, in a first comb anti-interference pattern in FIG. 6D, a plurality of strip areas whose time domain positions are 0, 1, 4, 7, 8, and 11 are a plurality of second areas, and a plurality of strip areas whose time domain positions are 2, 3, 5, 6, 9, 10, 12, and 13 are a plurality of first areas. The base station determines, based on a capability of target user equipment, that the comb anti-interference pattern is a comb anti-interference pattern that periodically takes effect.

Specifically, if the base station corresponding to the NR cell determines that a specified time domain position is a time domain position corresponding to the CRS interference signal of the at least one LTE cell, the base station determines that all frequency areas at the time domain position are second areas, namely, rate matching areas, used to carry the CRS interference signal of the at least one LTE cell. If the base station determines that a specified time domain position is different from any time domain position corresponding to the CRS interference signal of the at least one LTE cell, the base station determines that all frequency areas at the time domain position are first areas used to carry the service signal of the NR cell. The base station determines the comb anti-interference pattern based on all the first areas and second areas.

Figure 6E:
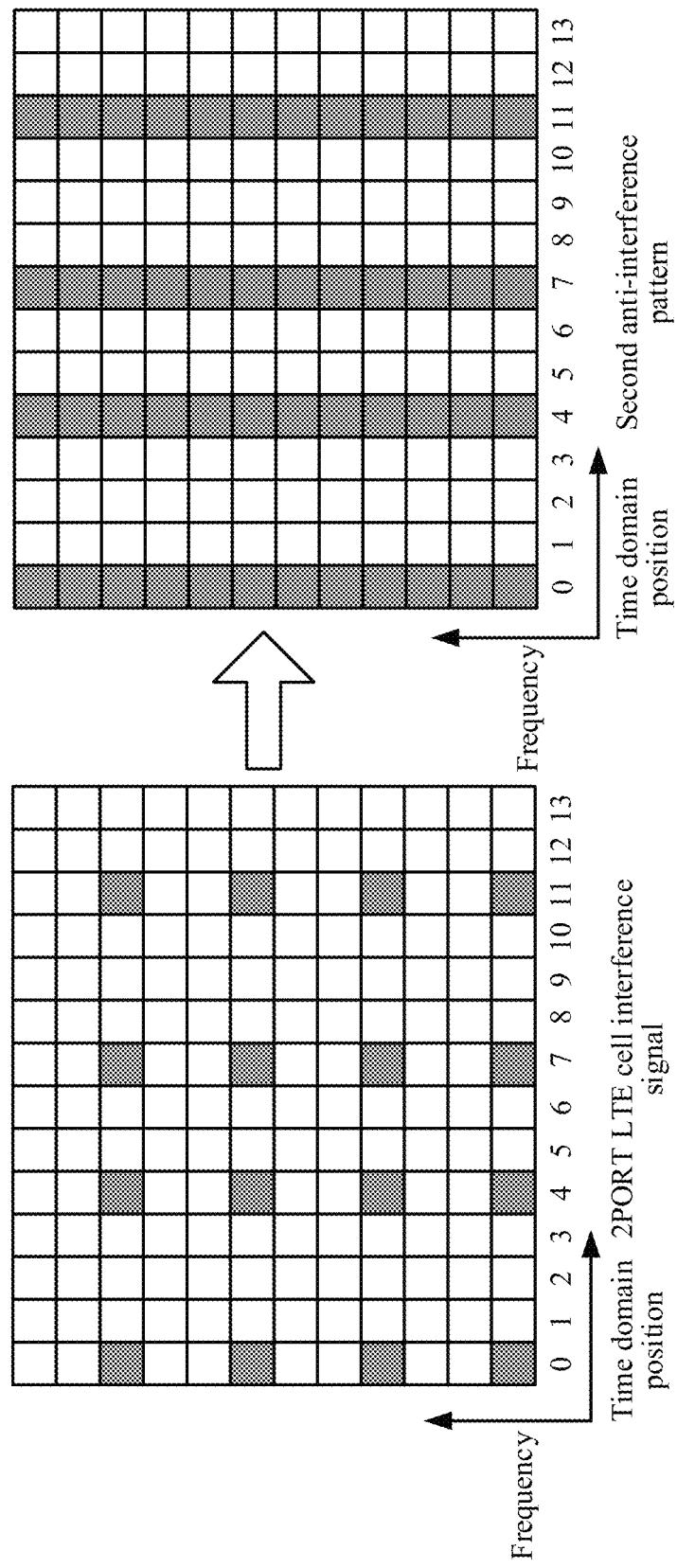
Figure 6F:
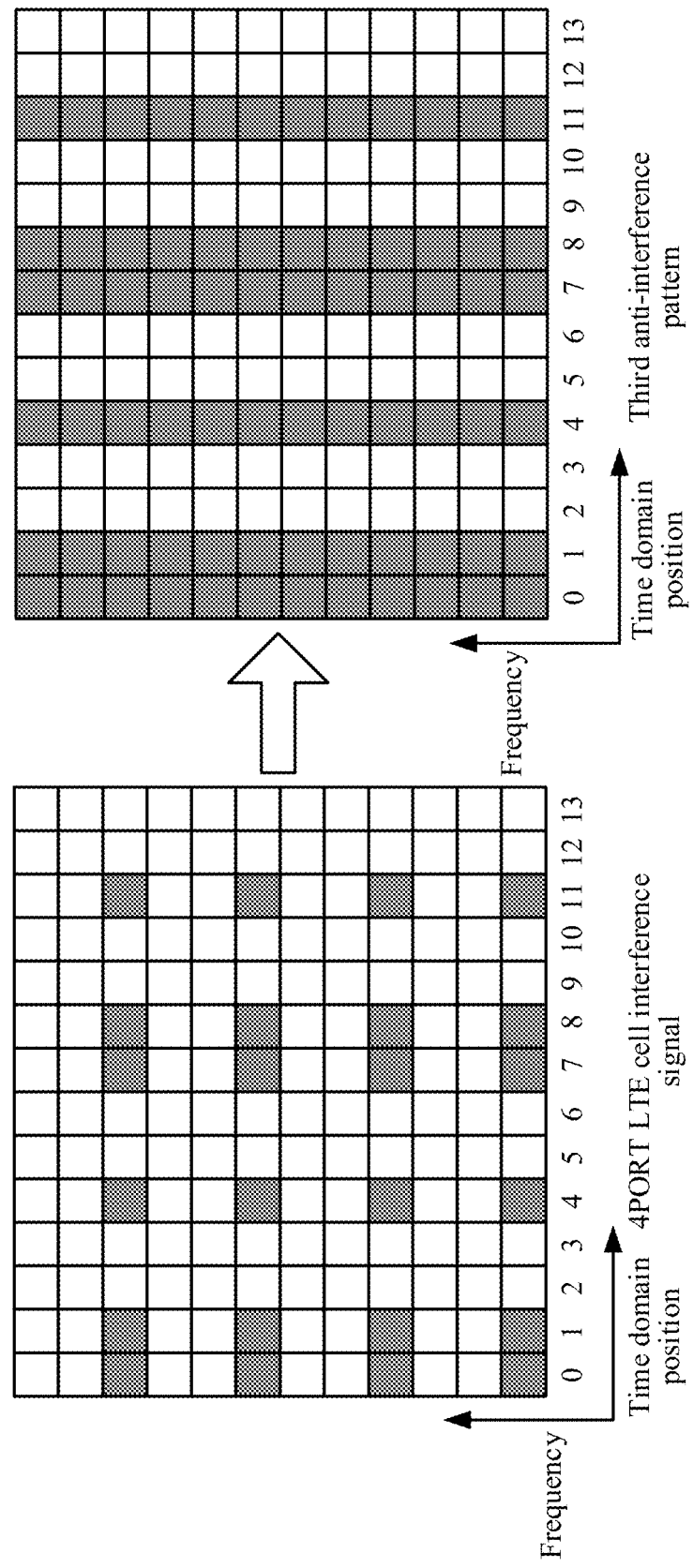

Refer to FIG. 6E and FIG. 6F. In a possible implementation, the CRS interference signal of the at least one LTE cell occupies two relatively fixed types of time domain symbol positions: 0, 4, 7, and 11 and 0, 1, 4, 7, 8, and 11. Therefore, when only signal interference of one neighboring LTE cell is considered or only one type of time domain symbol positions occupied by the CRS interference signal of the at least one LTE cell is considered, the base station corresponding to the NR cell may quickly determine the comb anti-interference pattern based on the CRS network configuration information of the at least one LTE cell. As shown in FIG. 6E, when the CRS interference signal of the at least one LTE cell occupies the time domain symbol positions 0, 4, 7, and 11, in other words, the CRS interference signal of the at least one LTE cell is a 2PORT CRS interference signal, the base station corresponding to the NR cell determines that an LTE-CRS 2PORT comb anti-interference pattern is a second comb anti-interference pattern. As shown in FIG. 6F, when the CRS interference signal of the at least one LTE cell occupies the time domain symbol positions 0, 1, 4, 7, 8, and 11, in other words, the CRS interference signal of the at least one LTE cell is a 4PORT CRS interference signal, the base station corresponding to the NR cell determines that an LTE-CRS 4PORT comb anti-interference pattern is a third comb anti-interference pattern.

The NR cell determines the comb anti-interference configuration information for the target user equipment based on the comb anti-interference pattern. The comb anti-interference configuration information includes the comb anti-interference pattern. The comb anti-interference pattern may be a specific image, or may be information, in another format, that may indicate corresponding content of the comb anti-interference pattern. Specifically, the comb anti-interference configuration information may include an information element RateMatchPattern of RRC signaling. When the LTE-CRS 2PORT anti-interference pattern is configured, ONE SLOT BIT STRING corresponding to RateMatchPattern is configured as 10001001000100, or TWO SLOT BIT STRING corresponding to RateMatchPattern is configured as 10001001000100010001001000100. When the LTE-CRS 4PORT anti-interference pattern is configured, ONE SLOT BIT STRING corresponding to RateMatchPattern is configured as STRING:11001001100100, or TWO SLOT BIT STRING corresponding to RateMatchPattern is configured as 11001001100100110010011 00100. The RRC standard signaling includes RRCReconfiguration signaling or RRC-Setup signaling. In addition, the RRC standard signaling may alternatively be other signaling. This is not specifically limited herein.

Specifically, the comb anti-interference configuration information may include the comb anti-interference pattern and other anti-interference information, where the other anti-interference information indicates other related anti-interference information such as a function of the comb anti-interference pattern, indication information, and how to put the comb anti-interference pattern into effect. The comb anti-interference configuration information may alternatively include only the comb anti-interference pattern. Before sending the comb anti-interference configuration information, the base station and the target user equipment successfully configure other related anti-interference information such as a function of the comb anti-interference pattern, indication information, and how to put the comb anti-interference pattern into effect. This is not specifically limited herein.

Figure 7A:
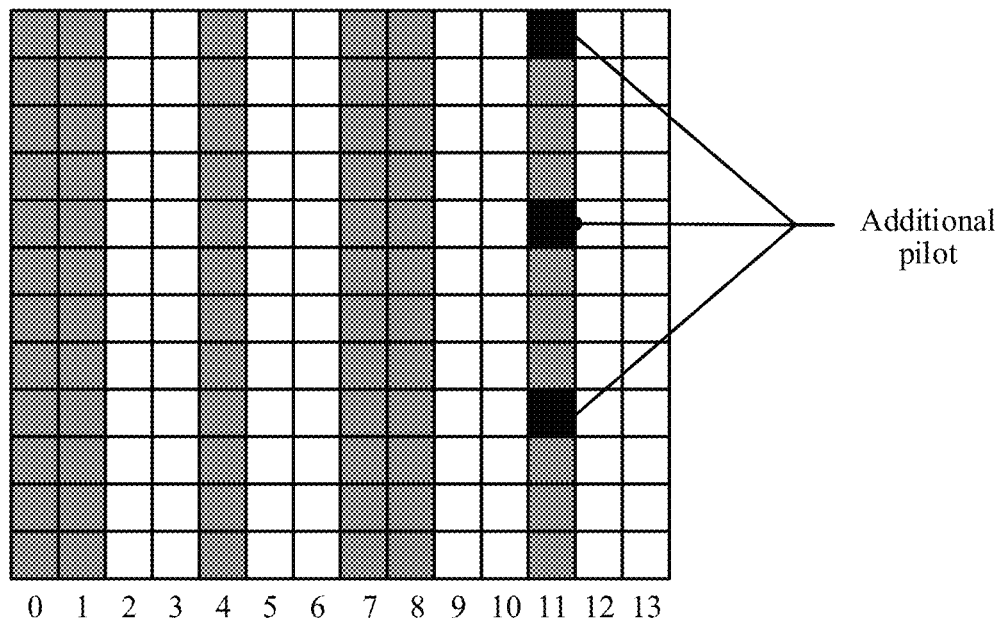
FIG. 7A and FIG. 7B each show a time-frequency domain graph and an anti-interference pattern according to an embodiment of this application.
Figure 7B:
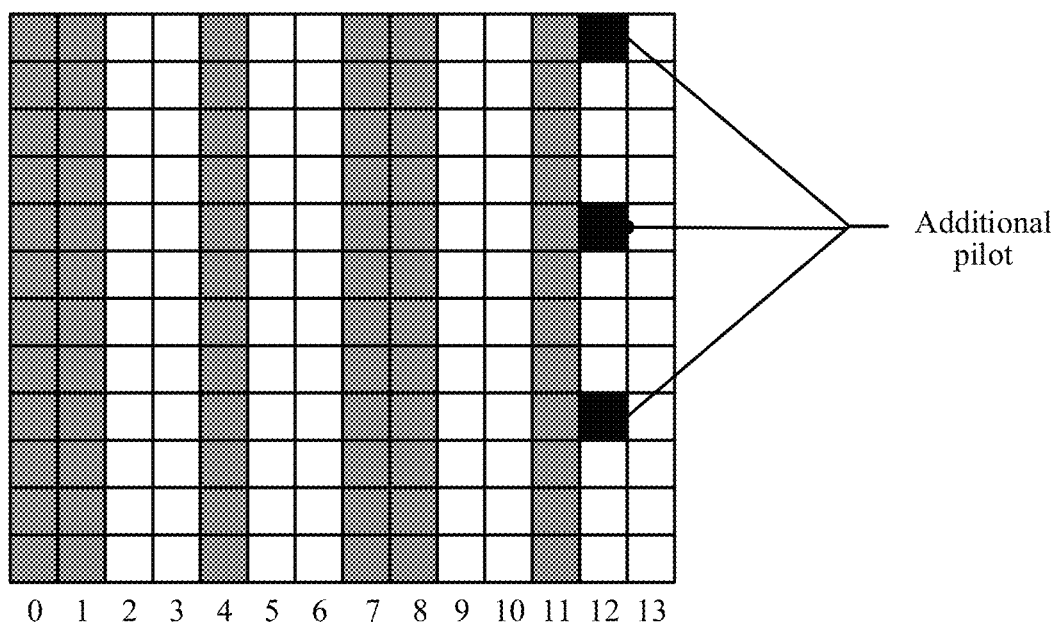

Refer to FIG. 7A and FIG. 7B. In a possible implementation, when the base station corresponding to the NR cell needs to configure, in the comb anti-interference configuration information for user equipment, additional pilot information for improving a demodulation capability of the user equipment, if the NR cell determines that a time domain position corresponding to an additional pilot is a time domain position used to carry the interference signal in the comb anti-interference pattern, that is, the time domain position belongs to a second area, as shown in FIG. 7A, the base station uses a first area carrying the service signal to carry the additional pilot information, as shown in FIG. 7B.

Specifically, when needing to configure the additional pilot for the user equipment, the base station corresponding to the NR cell configures an LTE CRS RateMatch indication in the comb anti-interference configuration information by using the RRC standard signaling. The additional pilot information can be configured in the comb anti-interference configuration information by using the indication. The RRC standard signaling includes an Lte-CRS-ToMatchAround standard information element. The base station corresponding to the NR cell determines that the time domain position corresponding to the additional pilot in the comb anti-interference pattern is 11, and the time domain position 11 is a time domain position used to carry the interference signal. In this case, the additional pilot conflicts with the comb anti-interference configuration information. Therefore, when the base station corresponding to the NR cell determines that a first preset condition is met, the base station uses the first area carrying the service signal to carry the additional pilot information, that is, uses a time domain position 12 to carry the additional pilot information. The time domain position 12 is the first area used to carry the service signal. In this way, the conflict between the additional pilot and the comb anti-interference configuration information is resolved, and the target user equipment may apply the two configurations at the same time.

Specifically, the first preset condition of the base station corresponding to the NR cell includes: (1) The base station corresponding to the NR cell configures the Lte-CRS-ToMatchAround information element for the target user equipment; (2) a front-loaded pilot configuration of the target user equipment is POS3, and the additional pilot configuration is POS1; and (3) the target user equipment supports an additional DMRS-DL-Alt additional pilot shift capability. In addition, the first preset condition may alternatively be another condition. This is not specifically limited herein.

503: The base station corresponding to the NR cell sends the comb anti-interference configuration information to the target user equipment.

The NR cell sends the comb anti-interference configuration information to the target user equipment, and correspondingly, the target user equipment receives the comb anti-interference configuration information sent by the NR cell.

504: The target user equipment puts, based on the comb anti-interference configuration information, the comb anti-interference pattern into effect.

Because the comb anti-interference pattern sent by the base station corresponding to the NR cell to the target user equipment is a periodic comb anti-interference pattern, the target user equipment puts, based on the periodic comb anti-interference pattern in the comb anti-interference configuration information, the comb anti-interference pattern into effect in this periodicity, in other words, uses the first area in the comb anti-interference pattern to carry a service signal between the base station corresponding to the NR cell and the target user equipment.

In this embodiment of this application, the comb anti-interference pattern in the comb anti-interference configuration information sent by the NR cell to the target user equipment is a periodic comb anti-interference pattern, and the comb anti-interference pattern may alternatively be a dynamic comb anti-interference pattern. The following provides specific descriptions.

2. The comb anti-interference pattern in the comb anti-interference configuration information sent by the base station corresponding to the NR cell to the target user equipment is a dynamic comb anti-interference pattern.

Figure 8:
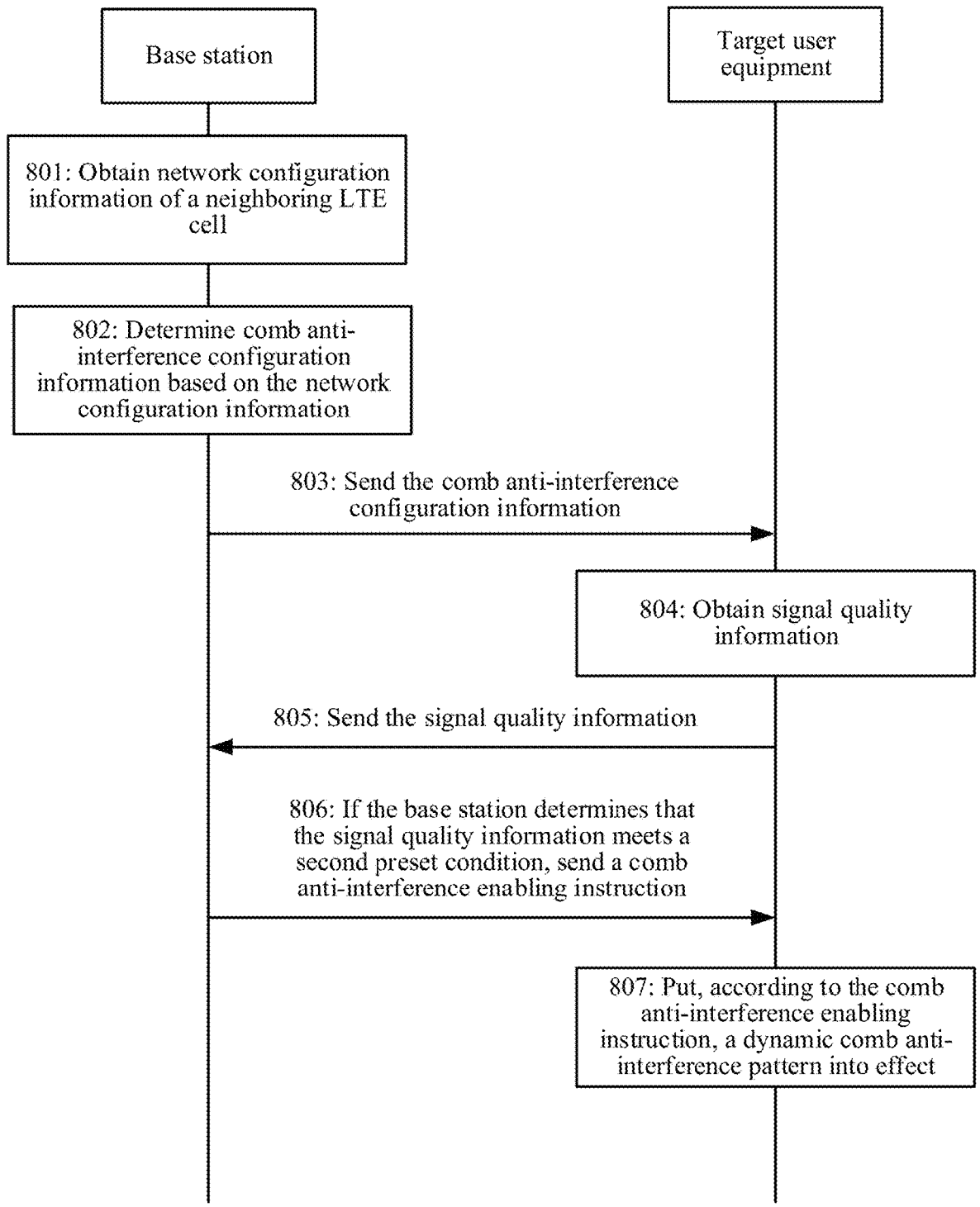
FIG. 8 is another schematic flowchart of an anti-interference method for a new radio network according to an embodiment of this application.

Refer to FIG. 8. Another procedure of an anti-interference method for an NR network in this embodiment of this application includes the following steps.

801: A base station obtains network configuration information of a neighboring LTE cell.

In this embodiment of this application, step 801 is the same as step 501, and details are not described herein again.

802: The base station determines comb anti-interference configuration information based on the network configuration information.

In this embodiment of this application, the base station corresponding to an NR cell determines, based on the network configuration information, that a comb anti-interference pattern in the comb anti-interference configuration information is a dynamic comb anti-interference pattern, where the dynamic comb anti-interference pattern is used by user equipment to put, based on an anti-interference enabling instruction sent by the base station corresponding to the NR cell, the dynamic comb anti-interference pattern into effect. Other part of step 802 is the same as step 502, and details are not described herein again.

803: The base station sends the comb anti-interference configuration information to target user equipment.

In this embodiment of this application, step 803 is the same as step 503, and details are not described herein again.

804: The target user equipment obtains signal quality information.

The target user equipment obtains the signal quality information of a service signal between the target user equipment and the base station corresponding to the NR cell, where the information indicates quality of the service signal between the target user equipment and the base station corresponding to the NR cell. The signal quality information includes at least one of a synchronization signal block SSB measurement value set or a channel state information-reference signal CSI-RS measurement value set. The SSB measurement value set includes at least one of a cell-level SSB measurement result, a measurement result of each SSB index, an SSB RSRP measurement value, an SSB RSRQ measurement value, and an SSB SINR measurement value. This is not specifically limited herein. The CSI-RS measurement value set includes at least one of a periodic CSI-RS measurement result, a user equipment-level aperiodic CSI-RS measurement result, CSI information, a CSI-RS CQI measurement value, a CSI-RS PMI measurement value, a CSI-RS RI measurement value, a CSI-RS RSRP measurement value, a CSI-RS RSRQ measurement value, and a CSI-RS SINR measurement value. This is not specifically limited herein.

805: The base station receives the signal quality information sent by the target user equipment.

The target user equipment sends the signal quality information to the base station corresponding to the NR cell, and correspondingly, the base station corresponding to the NR cell receives the signal quality information sent by the target user equipment.

806: If the base station determines that the signal quality information meets a second preset condition, the base station sends a comb anti-interference enabling instruction to the target user equipment.

If the base station corresponding to the NR cell determines that the signal quality information sent by the target user equipment meets the second preset condition, the base station corresponding to the NR cell sends the comb anti-interference enabling instruction to the target user equipment, where the instruction instructs the target user equipment to put the anti-interference pattern into effect. Correspondingly, the target user equipment receives the comb anti-interference enabling instruction sent by the NR cell.

The second preset condition includes: (1) One or more of the SSB RSRP measurement value, the SSB RSRQ measurement value, and the SSB SINR measurement value in the signal quality information is less than a first preset indicator; (2) one or more of the CSI-RS RSRP measurement value, the CSI-RS RSRQ measurement value, and the CSI-RS SINR measurement value in the signal quality information is less than a second preset indicator; (3) one or more of the CSI-RS CQI measurement value, the CSI-RS PMI measurement value, and the CSI-RS RI measurement value in the signal quality information is less than a third preset indicator; and (4) after the comb anti-interference pattern takes effect, spectral efficiency of the service signal between the target user equipment and the base station corresponding to the NR cell is higher than a fourth preset indicator. The second preset condition may alternatively be a combination of at least two of the foregoing four conditions. In addition, the second preset condition in this embodiment of this application may alternatively be another preset condition. This is not specifically limited herein.

807: The target user equipment puts, according to the comb anti-interference enabling instruction, the dynamic comb anti-interference pattern into effect.

The target user equipment puts, according to the comb anti-interference enabling instruction sent by the base station corresponding to the NR cell, the dynamic comb anti-interference pattern into effect in this scheduling periodicity, in other words, uses a first area in the comb anti-interference pattern to carry the service signal between the base station corresponding to the NR cell and the target user equipment.

Figure 9:
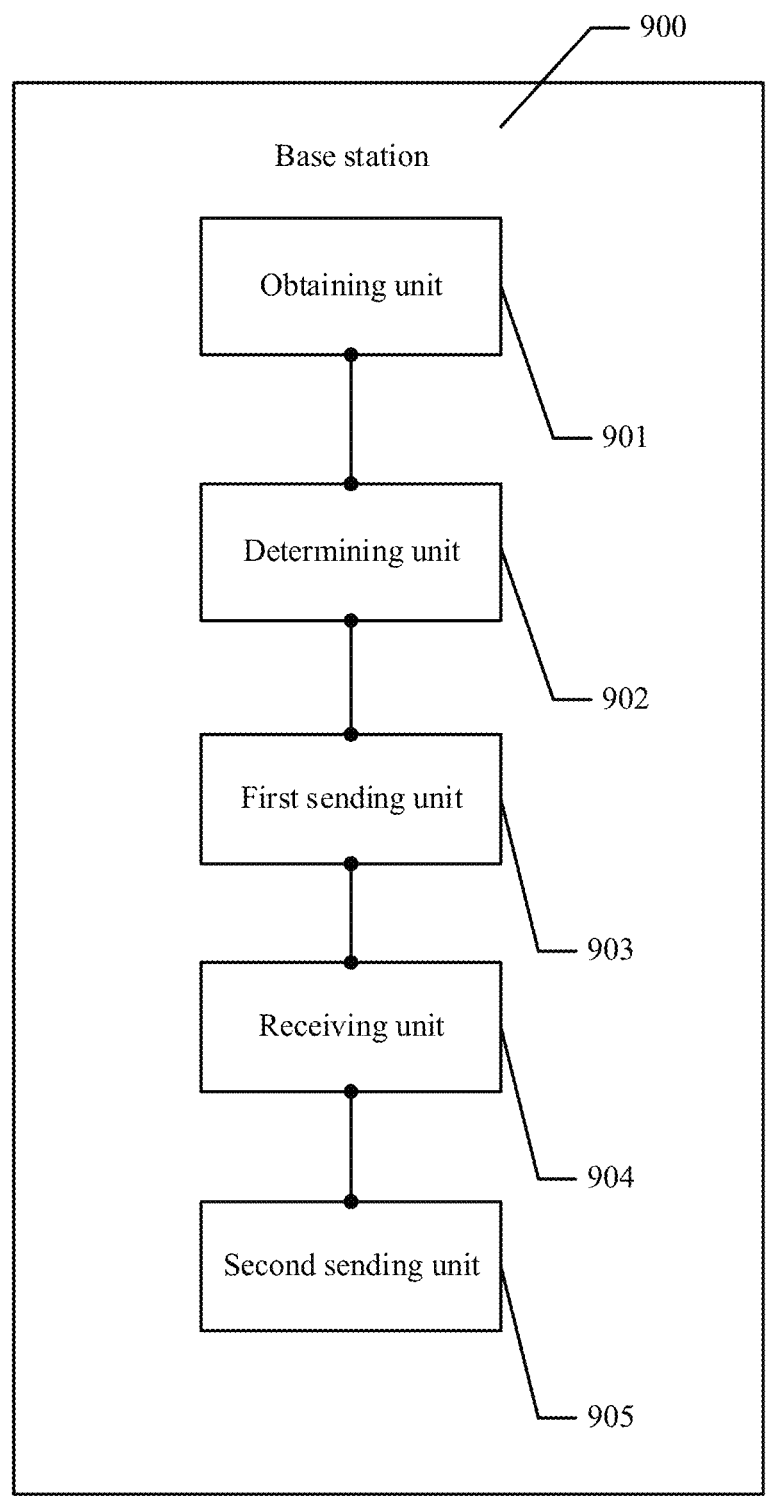
FIG. 9 is a schematic structural diagram of a base station according to an embodiment of this application.

The following describes a base station corresponding to an NR cell in an embodiment of this application. Refer to FIG. 9. An embodiment of this application provides a base station 900. The base station may be the base station in FIG. 5 and FIG. 8. The base station 900 includes an obtaining unit 901, a determining unit 902, and a first sending unit 903.

The obtaining unit 901 is configured to obtain network configuration information of at least one long term evolution LTE cell neighboring to the NR cell. For a specific implementation, refer to step 501 in the embodiment shown in FIG. 5: A base station corresponding to an NR cell obtains network configuration information of a neighboring LTE cell. In addition, refer to step 801 in the embodiment shown in FIG. 8: A base station obtains network configuration information of a neighboring LTE cell. Details are not described herein again.

The determining unit 902 is configured to determine anti-interference configuration information based on the network configuration information, where the anti-interference configuration information includes an anti-interference pattern, the anti-interference pattern includes a plurality of strip areas, the strip area indicates all frequency areas at a specified time domain position, the plurality of strip areas include at least one first area and at least one second area that are distributed in spacing, the first area is used to carry a service signal of the NR cell, and the second area is used to carry an interference signal of the at least one LTE cell. For a specific implementation, refer to step 502 in the embodiment shown in FIG. 5: The base station corresponding to the NR cell determines comb anti-interference configuration information based on the network configuration information. In addition, refer to step 802 in the embodiment shown in FIG. 8: The base station determines comb anti-interference configuration information based on the network configuration information. Details are not described herein again.

The first sending unit 903 is configured to send the anti-interference configuration information to target user equipment, where the anti-interference configuration information is used by the target user equipment to select the at least one first area to carry the service signal of the NR cell, and the target user equipment is any user equipment in a coverage area of the NR cell. For a specific implementation, refer to step 503 in the embodiment shown in FIG. 5: The base station corresponding to the NR cell sends the comb anti-interference configuration information to the target user equipment. In addition, refer to step 803 in the embodiment shown in FIG. 8: The base station sends the comb anti-interference configuration information to target user equipment. Details are not described herein again.

In a possible implementation, the determining unit 902 is configured to:
determine, from a time domain range of the base station based on the network configuration information, a time domain position of the at least one second area used to carry the interference signal of the at least one LTE cell, where the time domain position of the second area is included in a time domain position of the base station, the time domain position of the at least one second area is used to determine a time domain position of the at least one first area, and the time domain positions of the at least one second area and the at least one first area are used to determine the anti-interference configuration information.

For a specific implementation, refer to step 502 in the embodiment shown in FIG. 5: The base station corresponding to the NR cell determines comb anti-interference configuration information based on the network configuration information. In addition, refer to step 802 in the embodiment shown in FIG. 8: The base station determines comb anti-interference configuration information based on the network configuration information. Details are not described herein again.

In a possible implementation, the base station further includes a receiving unit 904 and a second sending unit 905.

The receiving unit 904 is configured to receive signal quality information sent by the target user equipment, where the signal quality information indicates quality of a service signal provided by the base station for the target user equipment. For a specific implementation, refer to step 805 shown in FIG. 8: The base station receives the signal quality information sent by the target user equipment. Details are not described herein again.

The second sending unit 905 is configured to: if the base station determines that the signal quality information meets a preset condition, send an anti-interference enabling instruction to the target user equipment, where the anti-interference enabling instruction instructs the target user equipment to put the anti-interference pattern into effect. For a specific implementation, refer to step 806 shown in FIG. 8: If the base station determines that the signal quality information meets a second preset condition, the base station sends a comb anti-interference enabling instruction to the target user equipment. Details are not described herein again.

In a possible implementation, the determining unit 902 is further configured to:
if the base station determines that a time domain position corresponding to additional pilot information belongs to the second area, use the first area to carry the additional pilot information.

For a specific implementation, refer to step 502 in the embodiment shown in FIG. 5: The base station corresponding to the NR cell determines comb anti-interference configuration information based on the network configuration information. In addition, refer to step 802 in the embodiment shown in FIG. 8: The base station determines comb anti-interference configuration information based on the network configuration information. Details are not described herein again.

In a possible implementation, the base station corresponding to the NR cell and a base station corresponding to the at least one LTE cell are a same base station, the network configuration information of the at least one LTE cell is stored in the base station corresponding to the at least one LTE cell, and the obtaining unit 901 is configured to:
extract the network configuration information that is of the at least one LTE cell neighboring to the NR cell and that is stored in the base station.

For a specific implementation, refer to step 501 in the embodiment shown in FIG. 5: A base station corresponding to an NR cell obtains network configuration information of a neighboring LTE cell. In addition, refer to step 801 in the embodiment shown in FIG. 8: A base station obtains network configuration information of a neighboring LTE cell. Details are not described herein again.

In a possible implementation, the base station corresponding to the NR cell and a base station corresponding to the at least one LTE cell are not a same base station, the CRS network configuration information of the at least one LTE cell is stored in the base station corresponding to the at least one LTE cell, and the obtaining unit 901 is configured to:
obtain the CRS network configuration information of the at least one LTE cell through signaling interaction with the base station corresponding to the at least one LTE cell. The base station corresponding to the NR cell and the base station corresponding to the at least one LTE cell may obtain the CRS network configuration information of the at least one LTE cell by querying a configuration of an inter-RAT neighboring cell. For a specific implementation, refer to step 501 in the embodiment shown in FIG. 5: A base station corresponding to an NR cell obtains network configuration information of a neighboring LTE cell. In addition, refer to step 801 in the embodiment shown in FIG. 8: A base station obtains network configuration information of a neighboring LTE cell. Details are not described herein again.

Figure 10:
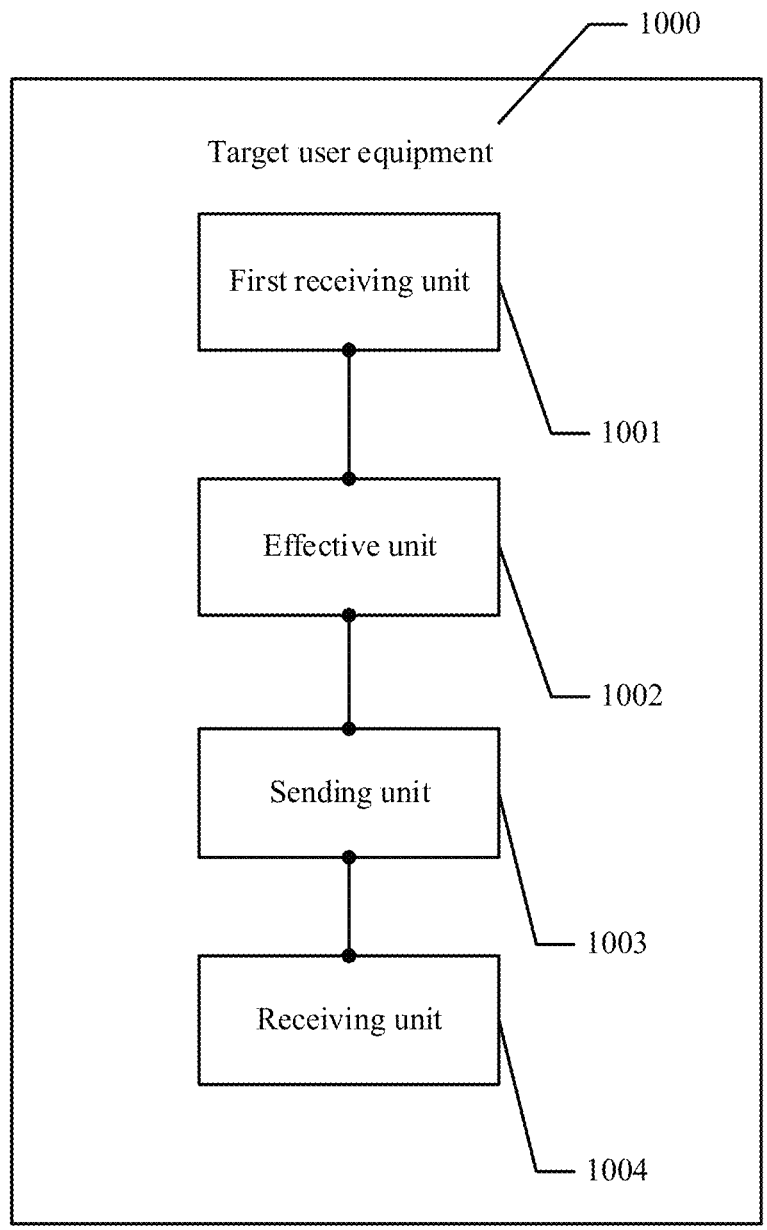
FIG. 10 is a schematic structural diagram of target user equipment according to an embodiment of this application.

The following describes target user equipment in an embodiment of this application. Refer to FIG. 10. An embodiment of this application provides target user equipment 1000. The target user equipment may be the target user equipment in FIG. 5 and FIG. 8. The target user equipment 1000 includes a first receiving unit 1001 and an effective unit 1002.

The first receiving unit 1001 is configured to receive anti-interference configuration information sent by a base station corresponding to a new radio NR cell, where the anti-interference configuration information includes an anti-interference pattern, the anti-interference pattern includes a plurality of strip areas, the strip area indicates all frequency areas at a specified time domain position, the plurality of strip areas include at least one first area and at least one second area that are distributed in spacing, the first area is used to carry a service signal of the NR cell, the second area is used to carry an interference signal of at least one LTE cell, and the anti-interference configuration information is used by the target user equipment to select the at least one first area to carry the service signal of the NR cell. For a specific implementation, refer to step 503 in the embodiment shown in FIG. 5: The base station corresponding to the NR cell sends the comb anti-interference configuration information to the target user equipment. In addition, refer to step 803 in the embodiment shown in FIG. 8: The base station sends the comb anti-interference configuration information to target user equipment. Details are not described herein again.

The effective unit 1002 is configured to put, based on the anti-interference configuration information, the anti-interference pattern into effect. For a specific implementation, refer to step 504 in the embodiment shown in FIG. 5: The target user equipment puts, based on the comb anti-interference configuration information, the comb anti-interference pattern into effect. Details are not described herein again.

In a possible implementation, the target user equipment further includes a sending unit 1003 and a receiving unit 1004.

The sending unit 1003 is configured to send signal quality information to the base station, where the signal quality information is used by the base station to send an anti-interference instruction to the target user equipment based on the signal quality information. For a specific implementation, refer to step 805 shown in FIG. 8: The base station receives the signal quality information sent by the target user equipment. Details are not described herein again.

The receiving unit 1004 is configured to receive the anti-interference enabling instruction sent by the base station, where the anti-interference enabling instruction instructs the target user equipment to put, based on the anti-interference configuration information, the anti-interference pattern into effect. For a specific implementation, refer to step 806 shown in FIG. 8: If the base station determines that the signal quality information meets a second preset condition, the base station sends a comb anti-interference enabling instruction to the target user equipment. Details are not described herein again.

Figure 11:
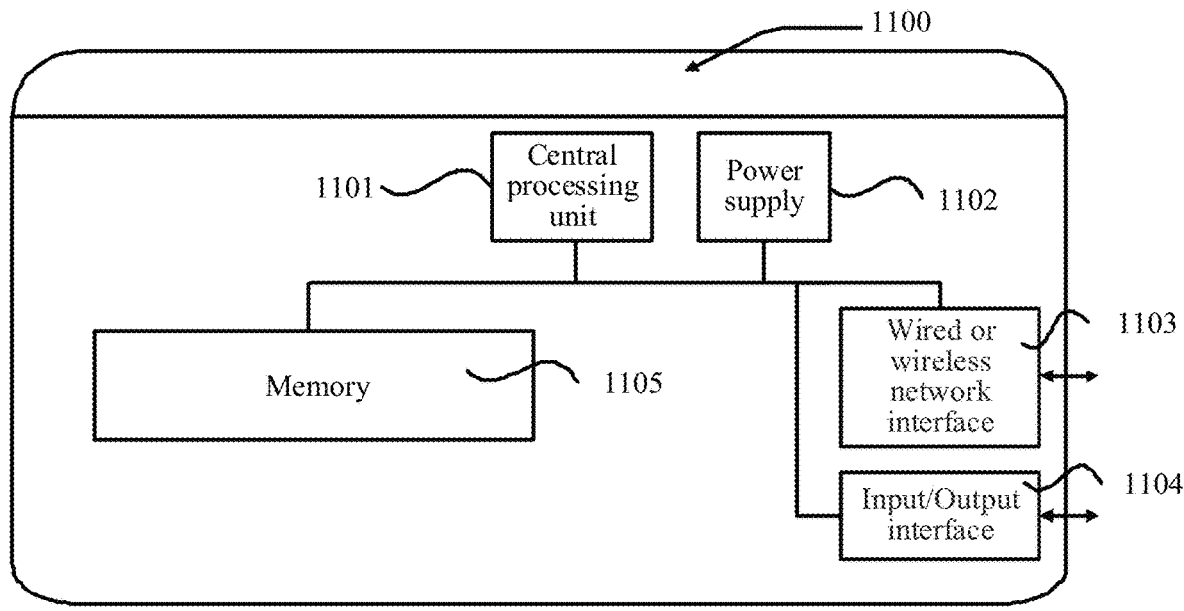
FIG. 11 is another schematic structural diagram of a base station according to an embodiment of this application.

FIG. 11 is a schematic structural diagram of a base station according to an embodiment of this application. The base station 1100 may include one or more central processing units (central processing units, CPU) 1101 and a memory 1105. The memory 1105 stores one or more application programs or data.

The memory 1105 may be a volatile memory or a persistent memory. The program stored in the memory 1105 may include one or more modules, and each module may include a series of instruction operations for the base station. Further, the central processing unit 1101 may be configured to: communicate with the memory 1105, and perform, on the base station 1100, a series of instruction operations in the memory 1105.

The central processing unit 1101 is configured to execute the computer program in the memory 1105, so that the base station 1100 is configured to perform the following steps: The base station obtains network configuration information of at least one long term evolution LTE cell neighboring to an NR cell; the base station determines anti-interference configuration information based on the network configuration information, where the anti-interference configuration information includes an anti-interference pattern, the anti-interference pattern includes a plurality of strip areas, the strip area indicates all frequency areas at a specified time domain position, the plurality of strip areas include at least one first area and at least one second area that are distributed in spacing, the first area is used to carry a service signal of the NR cell, and the second area is used to carry an interference signal of the at least one LTE cell; and the base station sends the anti-interference configuration information to target user equipment, where the anti-interference configuration information is used by the target user equipment to select the at least one first area to carry the service signal of the NR cell, and the target user equipment is any user equipment in a coverage area of the NR cell. For a specific implementation, refer to steps 501 to 304 in the embodiment shown in FIG. 5 and steps 801 to 807 in the embodiment shown in FIG. 8. Details are not described herein again.

The base station 1100 may further include one or more power supplies 1102, one or more wired or wireless network interfaces 1103, one or more input/output interfaces 1104, and/or one or more operating systems, such as Windows Server™, Mac OS X™, Unix™, Linux™, and FreeBSD™.

The base station 1100 may perform the operations performed by the base station in embodiments shown in FIG. 5 and FIG. 8. Details are not described herein again.

Figure 12:
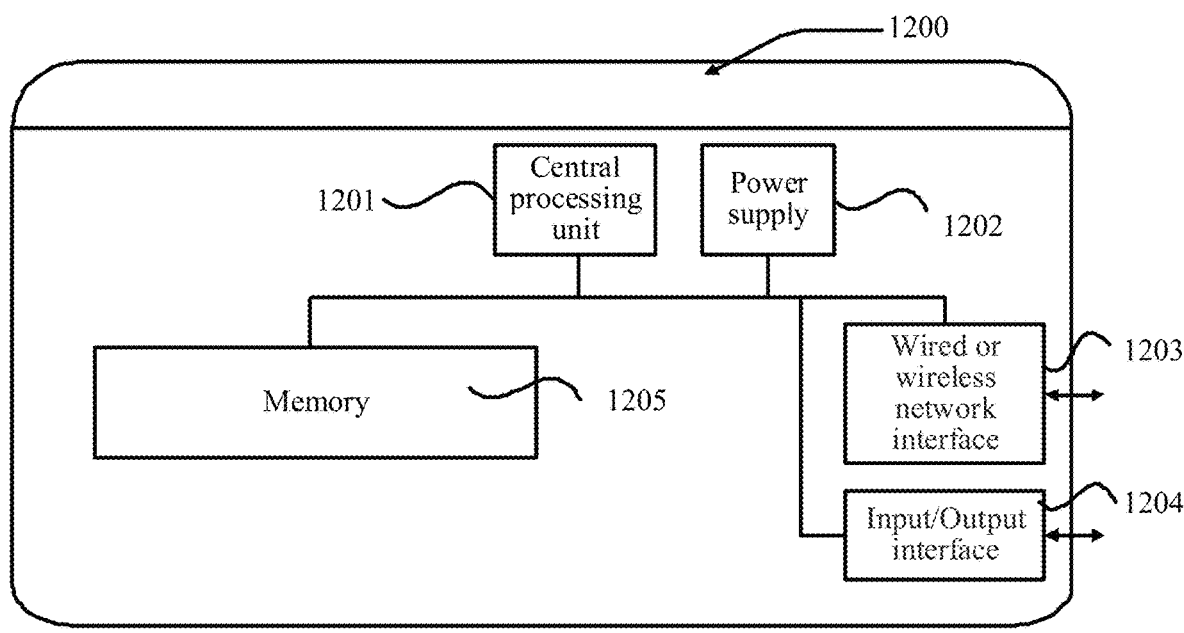
FIG. 12 is another schematic structural diagram of target user equipment according to an embodiment of this application.

FIG. 12 is a schematic structural diagram of target user equipment according to an embodiment of this application. The target user equipment 1200 may include one or more central processing units (central processing units, CPU) 1201 and a memory 1205. The memory 1205 stores one or more application programs or data.

The memory 1205 may be a volatile memory or a persistent memory. The program stored in the memory 1205 may include one or more modules, and each module may include a series of instruction operations for the target user equipment. Further, the central processing unit 1201 may be configured to: communicate with the memory 1205, and perform, on the target user equipment 1200, a series of instruction operations in the memory 1205.

The central processing unit 1201 is configured to execute the computer program in the memory 1205, so that the target user equipment 1200 is configured to perform the following steps: The target user equipment receives anti-interference configuration information sent by a base station corresponding to a new radio NR cell, where the anti-interference configuration information includes an anti-interference pattern, the anti-interference pattern includes a plurality of strip areas, the strip area indicates all frequency areas at a specified time domain position, the plurality of strip areas include at least one first area and at least one second area that are distributed in spacing, the first area is used to carry a service signal of the NR cell, the second area is used to carry an interference signal of at least one LTE cell, and the anti-interference configuration information is used by the target user equipment to select the at least one first area to carry the service signal of the NR cell; and the target user equipment puts, based on the anti-interference configuration information, the anti-interference pattern into effect. For a specific implementation, refer to steps 501 to 304 in the embodiment shown in FIG. 5 and steps 801 to 807 in the embodiment shown in FIG. 8. Details are not described herein again.

The target user equipment 1200 may further include one or more power supplies 1202, one or more wired or wireless network interfaces 1203, one or more input/output interfaces 1204, and/or one or more operating systems, such as Windows Server™, Mac OS X™, Unix™, Linux™, and FreeBSD™.

The target user equipment 1200 may perform operations performed by the target user equipment in embodiments shown in FIG. 5 and FIG. 8. Details are not described herein again.

Figure 13:
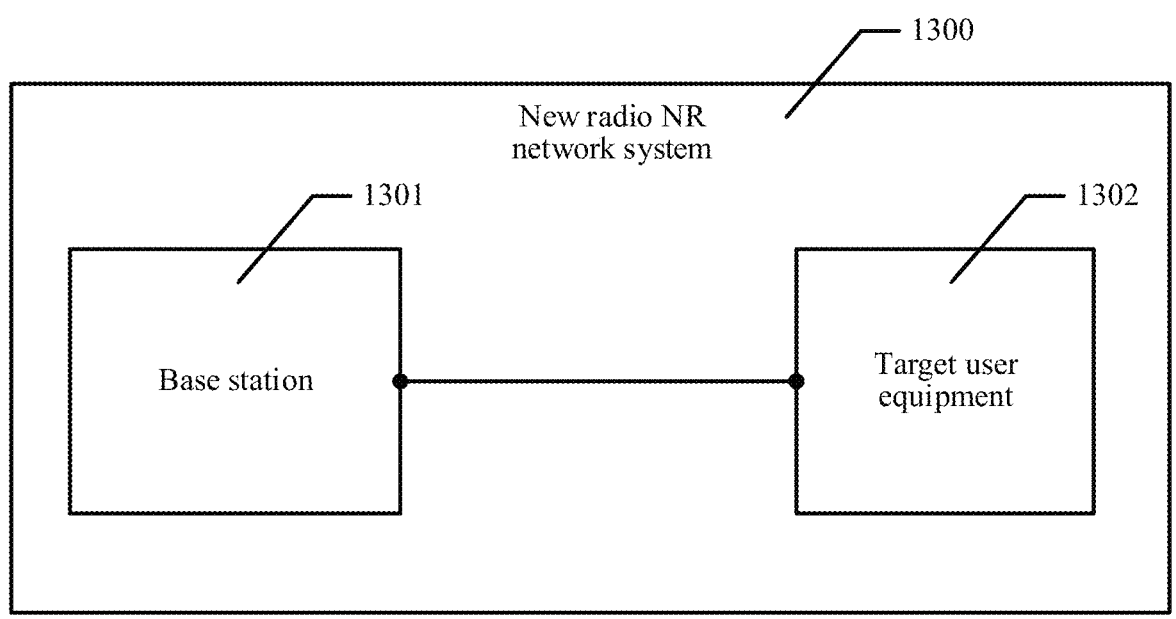
FIG. 13 is a schematic structural diagram of a new radio network system according to an embodiment of this application.

The following describes a new radio NR network system in an embodiment of this application. Refer to FIG. 13. An embodiment of this application provides a new radio NR network system 1300. The system includes the base station 1301 in the embodiment shown in FIG. 9 and the target user equipment 1302 in the embodiment shown in FIG. 10. The base station 1301 is connected to the target user equipment 1302.

The system may perform operations performed by the new radio NR network system in the embodiment shown in any one of FIG. 5 and FIG. 8. For a specific implementation, refer to steps 501 to 304 in the embodiment shown in FIG. 5 and steps 801 to 807 in the embodiment shown in FIG. 8. Details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

What is claimed is:

1. A method for communication between a base station and a target user equipment, comprising:
   obtaining network configuration information of at least one long term evolution (LTE) cell neighboring to a new radio (NR) cell;
   determining, based on the network configuration information, anti-interference configuration information that comprises an anti-interference pattern having a plurality of strip areas for carrying respective signals of the at least one LTE cell and the NR cell, wherein each of the plurality of strip areas occupies an entire frequency domain of a time-frequency domain graph at a specified time domain position of the time-frequency domain graph, the plurality of strip areas comprise at least one first area and at least one second area that are distributed in time domain spacing, the at least one first area is used to carry a service signal of the NR cell, and the at least one second area is used to carry an interference signal of the at least one LTE cell; and
   sending the anti-interference configuration information to the target user equipment for selecting the at least one first area to carry the service signal of the NR cell.

2. The method of claim 1, the determining the anti-interference configuration information comprising:
   determining, based on the network configuration information, a time domain position of the at least one second area from a time domain range of the base station, wherein the time domain position of the second area is included in a time domain position of the base station and used to determine a time domain position of the at least one first area, and the time domain positions of the at least one second area and the at least one first area are used to determine the anti-interference configuration information.

3. The method of claim 1, after the sending the anti-interference configuration information to the target user equipment, the method further comprising:
   receiving, from the target user equipment, signal quality information indicating quality of a service signal provided by the base station for the target user equipment;

determining that the signal quality information meets a preset condition; and sending an anti-interference enabling instruction to the target user equipment to instruct the target user equipment to put the anti-interference pattern into effect.

4. The method of claim 1, wherein the anti-interference configuration information comprises pilot information carried in the first area, a time domain position corresponding to the pilot information belongs to the second area.

5. The method of claim 1, the determining, based on the network configuration information, the anti-interference configuration information comprising:
determining the anti-interference pattern based on a type of cell reference signal (CRS) interference signal of the at least one LTE cell, the type of CRS interference signal comprising at least one of 2 port CRS interference signal or 4 port CRS interference signal.

6. The method of claim 1, wherein the anti-interference configuration information comprises an information element RateMatchPattern including a bit string associated with a type of LTE-cell reference signal (LTE-CRS) port that includes at least one of a LTE-CRS 4 port or a LTE-CRS 2 port.

7. The method of claim 1, wherein the method is performed by the base station or a chip of the base station, the base station corresponding to the NR cell.

8. A method for communication between a target user equipment and a base station, comprising:
receiving, from the base station, anti-interference configuration information that comprises an anti-interference pattern having a plurality of strip areas for respective signals of at least one long term evolution (LTE) cell and a new radio (NR) cell, wherein each of the plurality of strip areas occupies an entire frequency domain of a time-frequency domain graph at a specified time domain position of the time-frequency domain graph, the plurality of strip areas comprise at least one first area and at least one second area that are distributed in time domain spacing, the at least one first area is used to carry a service signal of the NR cell, the at least one second area is used to carry an interference signal of the at least one LTE cell, and the anti-interference configuration information is used for selecting the at least one first area to carry the service signal of the NR cell; and
putting the anti-interference pattern into effect based on the anti-interference configuration information.

9. The method of claim 8, prior to the putting the anti-interference pattern into effect, the method further comprising:
sending signal quality information to the base station; and
receiving, from the base station in response to sending the signal quality information, an anti-interference enabling instruction instructing the target user equipment to put the anti-interference pattern into effect based on the anti-interference configuration information.

10. The method of claim 8, wherein the anti-interference configuration information comprises pilot information carried in the first area, a time domain position corresponding to the pilot information belongs to the second area.

11. The method of claim 8, wherein the anti-interference pattern corresponds to a type of CRS interference signal of the at least one LTE cell, the type of cell reference signal (CRS) interference signal comprising at least one of 2 port CRS interference signal or 4 port CRS interference signal.

12. The method of claim 8, wherein the anti-interference configuration information comprises an information element RateMatchPattern including a bit string associated with a type of LTE-cell reference signal (LTE-CRS) port that includes at least one of a LTE-CRS 4 port or a LTE-CRS 2 port.

13. The method of claim 8, wherein the method is performed by the target equipment or a chip of the target equipment.

14. An apparatus, comprising:
a memory configured to store instructions; and
at least one processor communicatively coupled with the memory, wherein the at least one processor is configured to execute the instructions to:
receive, from a base station, anti-interference configuration information that comprises an anti-interference pattern having a plurality of strip areas for respective signals of at least one long term evolution (LTE) cell and a new radio (NR) cell, wherein each of the plurality of strip areas occupies an entire frequency domain of a time-frequency domain graph at a specified time domain position of the time-frequency domain graph, the plurality of strip areas comprise at least one first area and at least one second area that are distributed in time domain spacing, the at least one first area is used to carry a service signal of the NR cell, the at least one second area is used to carry an interference signal of the at least one LTE cell, and the anti-interference configuration information is used for selecting the at least one first area to carry the service signal of the NR cell; and
put the anti-interference pattern into effect based on the anti-interference configuration information.

15. The apparatus of claim 14, wherein the at least one processor is further configured to execute the instructions to:
send signal quality information to the base station; and
receive, from the base station in response to sending the signal quality information, an anti-interference enabling instruction instructing the apparatus to put the anti-interference pattern into effect based on the anti-interference configuration information.

16. The apparatus of claim 14, wherein the anti-interference configuration information comprises pilot information carried in the first area, a time domain position corresponding to the pilot information belongs to the second area.

17. The apparatus of claim 14, wherein the anti-interference pattern corresponds to a type of cell reference signal (CRS) interference signal of the at least one LTE cell, the type of CRS interference signal comprising at least one of 2 port CRS interference signal or 4 port CRS interference signal.

18. The apparatus of claim 14, wherein the anti-interference configuration information comprises an information element RateMatchPattern including a bit string associated with a type of LTE-cell reference signal (LTE-CRS) port that includes at least one of a LTE-CRS 4 port or a LTE-CRS 2 port.

19. The apparatus of claim 14, wherein the apparatus is a user equipment or a chip of the user equipment.

* * * * *